United States Patent [19]

Takeda et al.

[11] Patent Number: 4,931,882
[45] Date of Patent: Jun. 5, 1990

[54] IMAGE RECORDING APPARATUS WITH EVENING OF THE RECORDING MEDIUM

[75] Inventors: Hiroaki Takeda, Kawasaki; Masato Ishida, Yokohama; Eiichi Abe, Yokohama; Isamu Sato, Yokohama, all of Japan

[73] Assignee: Canon Kabushiki Kaisha, Tokyo, Japan

[21] Appl. No.: 177,501

[22] Filed: Apr. 4, 1988

[30] Foreign Application Priority Data

Apr. 2, 1987 [JP] Japan .................................. 62-79572
Apr. 2, 1987 [JP] Japan .................................. 62-79576
Apr. 2, 1987 [JP] Japan .................................. 62-79577

[51] Int. Cl.⁵ .............................................. H04N 1/04
[52] U.S. Cl. .................................... 358/474; 358/296;
358/447; 358/475; 346/160
[58] Field of Search ................ 358/296, 298, 300, 280,
358/282, 284, 302, 475, 443, 464, 447; 355/14
R, 3 R, 218, 244, 271; 346/160

[56] References Cited

U.S. PATENT DOCUMENTS

| | | | |
|---|---|---|---|
| 3,689,932 | 9/1972 | Gerber | 358/302 |
| 4,002,829 | 1/1977 | Hutchison | 358/302 |
| 4,379,631 | 4/1983 | Kitamura | 355/3 R |
| 4,655,577 | 4/1987 | Ikuta | 355/14 R |
| 4,660,082 | 4/1987 | Tomohisa et al. | 358/284 |
| 4,720,750 | 1/1988 | Watanabe | 358/300 |
| 4,734,783 | 3/1988 | Horikawa | 358/280 |
| 4,739,350 | 4/1988 | Arao | 346/160 |
| 4,777,510 | 10/1988 | Russel | 355/3 R |
| 4,783,681 | 11/1988 | Tanaka et al. | 355/3 R |
| 4,796,093 | 1/1989 | Asano | 358/280 |
| 4,809,042 | 2/1989 | Homma | 346/160 |

*Primary Examiner*—Howard W. Britton
*Assistant Examiner*—Kim Yen Vu
*Attorney, Agent, or Firm*—Fitzpatrick, Cella, Harper & Scinto

[57] ABSTRACT

An image recording apparatus includes a first recording unit, a second recording unit, and a control unit. The first recording unit scans an original image and records an image on a recording medium. The first recording unit has a first operation mode for evening a surface of the recording medium. The second recording unit records an image on the recording medium. The second recording unit has a second operation mode for evening the surface of the recording medium. The control unit controls the first and second recording units. The control unit controls the first recording unit so as to even the surface of the recording medium in the first operation mode at a start of image recording.

17 Claims, 29 Drawing Sheets

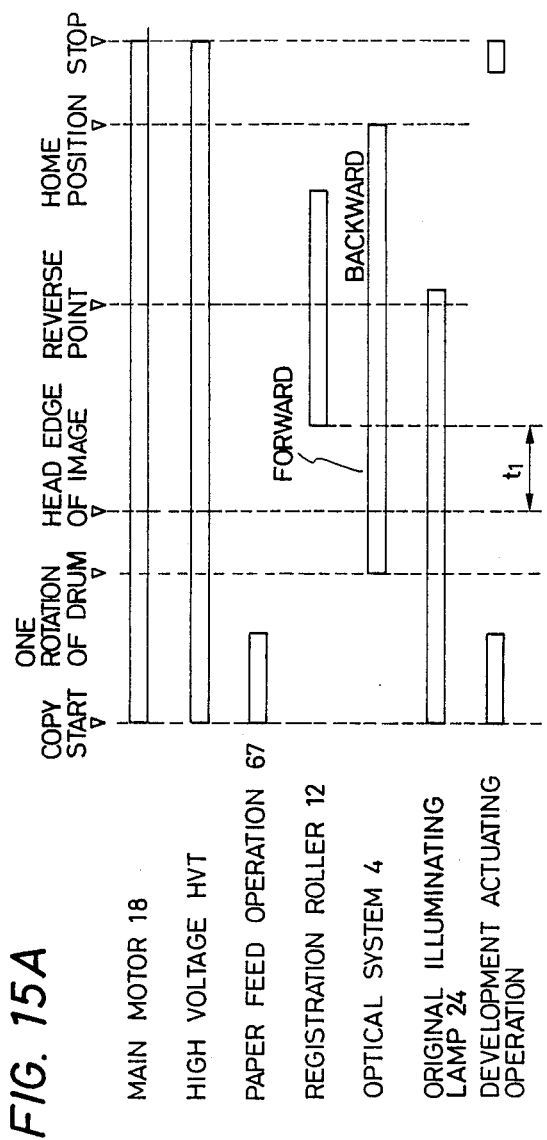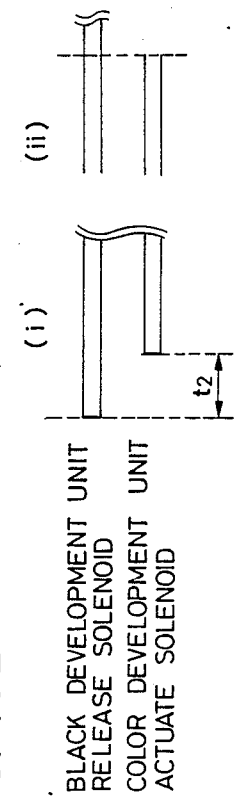
FIG. 15A
FIG. 15B

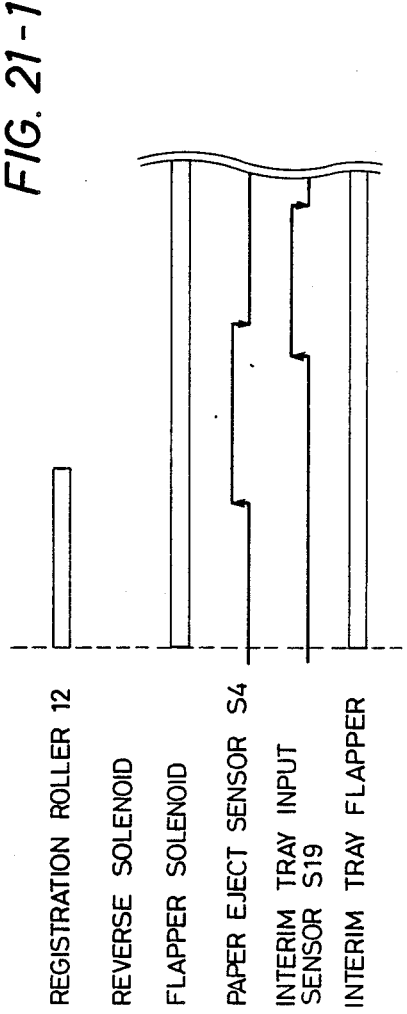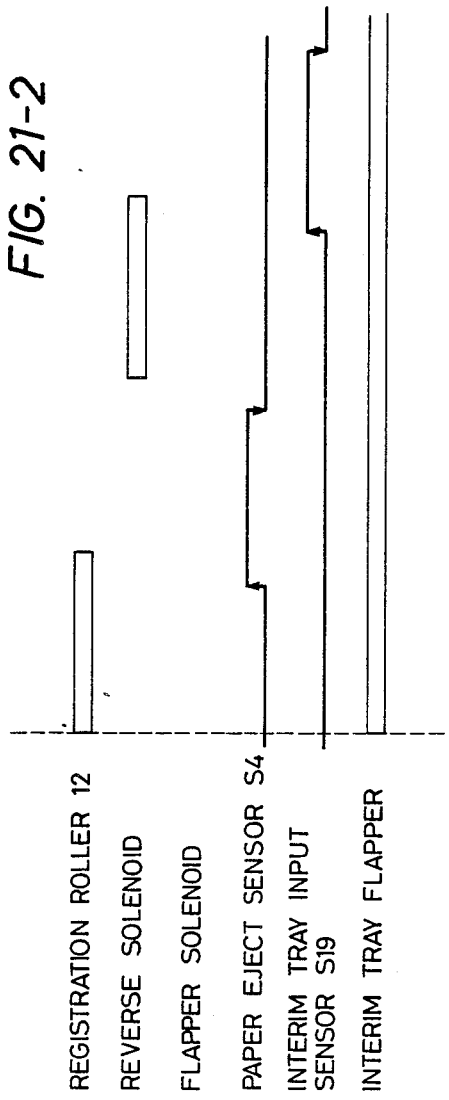

FIG. 27-1
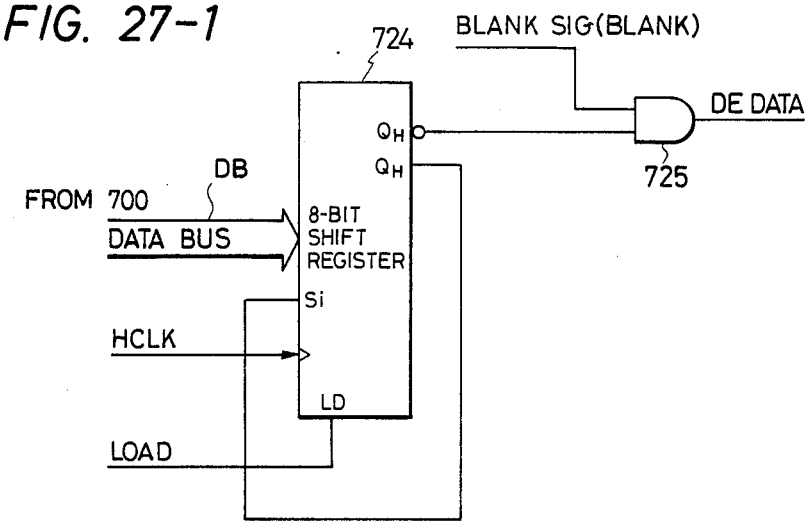
FIG. 27-2
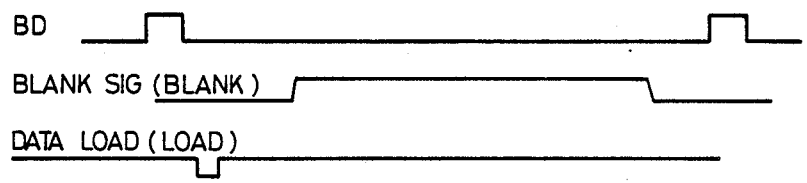
FIG. 27-3A  FIG. 27-3B
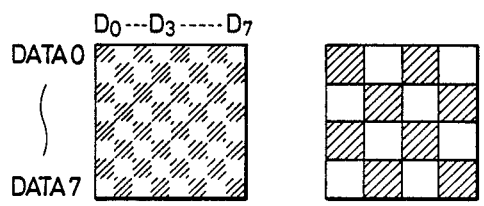
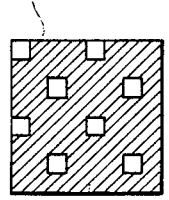
FIG. 27-3C $P_1(x_1, y_1), P_1'(x_1', y_1')$
$P_2(x_2, y_2), P_2'(x_2', y_2')$

REDUCTION
ENLARGEMENT
MAGNIFICATION α

$P_1 \times \alpha$
$P_1' \times \alpha$
$P_2 \times \alpha$
$P_2' \times \alpha$

IMAGE RECORDING APPARATUS WITH EVENING OF THE RECORDING MEDIUM

BACKGROUND OF THE INVENTION

1. Field of the Invention

The present invention relates to an image recording apparatus suitably used for a copying or facsimile machine for recording image information on a recording medium.

2. Related Background Art

A typical example of an apparatus of this type is a so-called dual mode copying machine in which information such as date and characters input from a host computer or the like is recorded by a sub-record optical system while an original is copied by a main record optical system. The sub-record optical system may comprise a laser having a larger output quantity of light than that of an LED (Light-Emitting Diode) to erase an unnecessary portion of an image, in addition to image recording.

When a laser is used as a sub-record optical system, it is generally employed to adjust a value of a current supplied to the laser by properly controlling a time interval of a laser, because an optical output (light quantity) changes as a function of temperature. A typical conventional adjustment method is performed as follows. A sensor is arranged to monitor an optical output from the laser, and the laser is then deenergized. Thereafter, a current is gradually increased until a sensor output reaches a predetermined value.

When such a conventional control method is employed, the optical output is temporarily erased (OFF), an unnecessary black image is formed in background scanning; that is, in the case where the portion irradiated with a laser beam is recorded in white, for example.

When a laser is used in a sub-record optical system to erase an unnecessary image portion at the start of recording, copying cannot be started until a polygonal mirror for laser scanning is rotated and reaches a steady speed. In addition, the ON time of the laser is prolonged to shorten the mechanical service time of the apparatus, thus degrading reliability of the apparatus.

In multifunctioning of an image recording apparatus such as a copying machine in recent years, functions such as a variable magnification function, an automatic density adjustment function, an automatic paper size selection function, an automatic magnification selection function, a multicolor copying function, an automatic both side recording function, an image editing function, a two-color development function accessible with an operation of one button, a page consecutive copying function, and a binding margin adjustment function have been available. At present, combinations of these functions are also required.

In such a conventional apparatus described above, it is expected to easily emphasize image information.

Examples of an apparatus for recording an image on a common recording medium by using a plurality of light sources are described in U.S. Pat. Nos. 4,552,449, 4,434,982, 4,378,156, and U.S. Pat. No. 4,517,579, and U.S. Ser. No. 839,358 (Aug. 5, 1986) now abandoned. There is much room left for further improvements.

SUMMARY OF THE INVENTION

It is an object of the present invention to eliminate the conventional drawbacks described above.

It is another object of the present invention to improve an image recording apparatus having a plurality of light sources.

It is still another object of the present invention to provide an image recording apparatus having high reliability.

It is still another object of the present invention to provide an image recording apparatus having good operability.

It is still another object of the present invention to provide an image recording apparatus having prolonged service life.

It is still another object of the present invention to provide an image recording apparatus wherein recording operations can be started at earlier timings.

It is still another object of the present invention to provide an image recording apparatus capable of forming a high-quality reproduced image.

It is still another object of the present invention to provide an image recording apparatus capable of outputting an image in a desired form.

It is still another object of the present invention to provide an image recording apparatus capable of obtaining a desired reproduced image.

It is still another object of the present invention to provide an image recording apparatus capable of allowing light quantity control of a laser to always stabilize the laser quantity without formation of an unnecessary image portion even when consecutive copying.

It is still another object of the present invention to provide an image recording apparatus capable of shortening a record time at the start of recording to hence prolong the laser service life and improve laser reliability.

It is still another object of the present invention to provide an image recording apparatus capable of easily emphasizing image information recorded in a designated record area without degrading input image information in the designated record area.

The above and other objects, features, and advantages of the present invention will be apparent from the following detailed description with reference to the accompanying drawings and the appended claims.

BRIEF DESCRIPTION OF THE DRAWINGS

FIGS. 13 to 22 are timing charts of operating timings of the components of this embodiment, in which FIG. 13 is a timing chart of a power-on operation, FIG. 14 is a timing chart for when a mid-plate lift clutch is operated, FIGS. 15A and 15B are timing charts for a copy operation, FIG. 16 is a timing chart of a paper feed operation, FIG. 17 is a timing chart showing a copy operation of a first page in a single both-side copy mode, FIG. 18 is a timing chart showing a copy operation of a first page in a single multicopy mode, FIG. 19 is a timing chart showing a second page copy operation in a single both-side copy and multicopy mode, FIGS. 20-1 and 20-3 are timing charts showing a transverse registration adjustment operation, and FIG. 20-2 is a view for explaining this operation, FIGS. 21-1 and 21-2 are timing charts showing a first page copy operation in the both side copy and multicopy mode when an interim tray is used, and FIG. 22 is a timing chart showing a second page copy operation in the both side copy and multicopy mode;

FIG. 27-1 is a circuit diagram showing a circuit arrangement of a dot erase circuit shown in FIG. 24;

FIG. 27-2 is a timing chart showing timings of the dot erase circuit in FIG. 24;

FIGS. 27-3A to 27-3C are views showing output patters from the dot erase circuit shown in FIG. 24;

DETAILED DESCRIPTION OF THE PREFERRED EMBODIMENT

A preferred embodiment of the present invention will be described in detail with reference to the accompanying drawings.

Figure 1A:
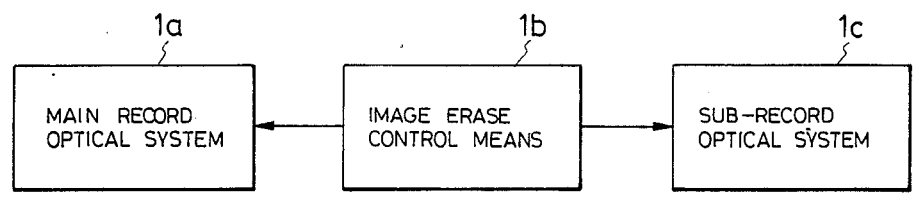
FIGS. 1A to 1C are respectively block diagrams showing first to third basic arrangements for easily explaining an embodiment of the present invention.

FIG. 1A shows a first basic arrangement exemplifying an embodiment of the present invention. The first basic arrangement includes a main record optical system $1a$ employed to scan an original, capable of erasing an image by irradiating a charged area on a photosensitive body with illumination light emitted from an original exposure lamp, a sub-record optical system $1c$ capable of erasing an image or a designated position by selectively irradiating the charged area with light, and an image erase control means $1b$ for causing the main record optical system $1a$ to perform image erase processing at the start of recording and thereafter the sub-record optical system $1c$ to perform image erase processing.

The main record optical system $1a$ includes a white plate arranged at a predetermined position, for example. An original scanning system is stopped at the predetermined position under the control of the image erase control means $1b$ to reflect illumination light from the original exposure lamp by the white plate, thereby performing image erase processing. The sub-record optical system $1c$ includes, e.g., a laser generating means, a laser scan polygonal mirror, and a polygonal mirror rotation motor.

Figure 1B:
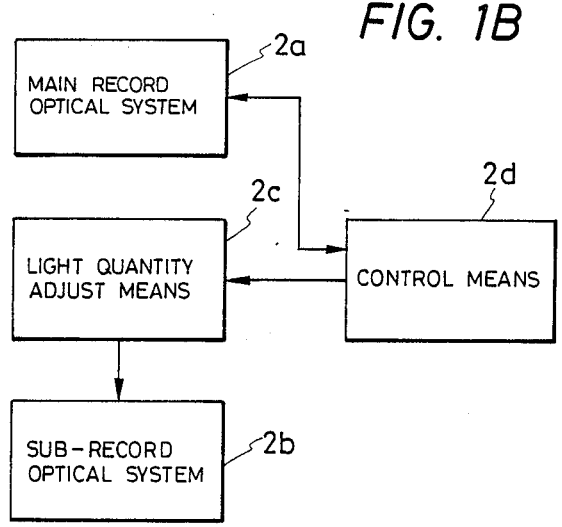

FIG. 1B is a second basic arrangement exemplifying the embodiment of the present invention. The second basic arrangement includes a main record optical system $2a$ employed to scan an original, capable of erasing an image by irradiating a charged area on a photosensitive drum with illumination light emitted from an original exposure lamp, a sub-record optical system $2b$ capable of erasing an image on a designated position by selectively irradiating the charged area with the illumination light, a light quantity adjust means $2c$ for adjusting a light quantity of the sub-record optical system $2b$ to a predetermined value, and a control means $2d$ for operating the light quantity adjust means $2c$ during image erase processing of the main record optical system $2a$.

The main record optical system $2a$ includes a white plate arranged at a predetermined position for example. An original scanning system is stopped at the predetermined position under the control of the control means $2d$ to reflect illumination light from the original exposure lamp by the white plate, thereby performing image erase processing. The sub-record optical system $2b$ includes, e.g., a laser generating means, a laser scan polygonal mirror, and a polygonal mirror rotation motor.

Figure 1C:
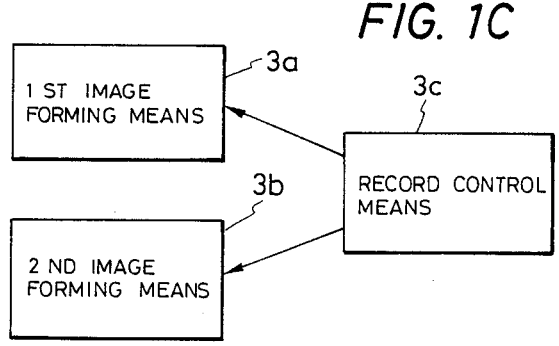

FIG. 1C shows a third basic arrangement exemplifying the embodiment of the present invention. The third basic arrangement comprises a first image forming means $3a$ constituted by a first optical system, a second image forming means $3b$ constituted by a second optical system, and a record control means $3c$ for forming a dot image formed by the second image forming means $3b$ in a designated area of an original image formed by the first image forming means $3a$.

Figure 2:
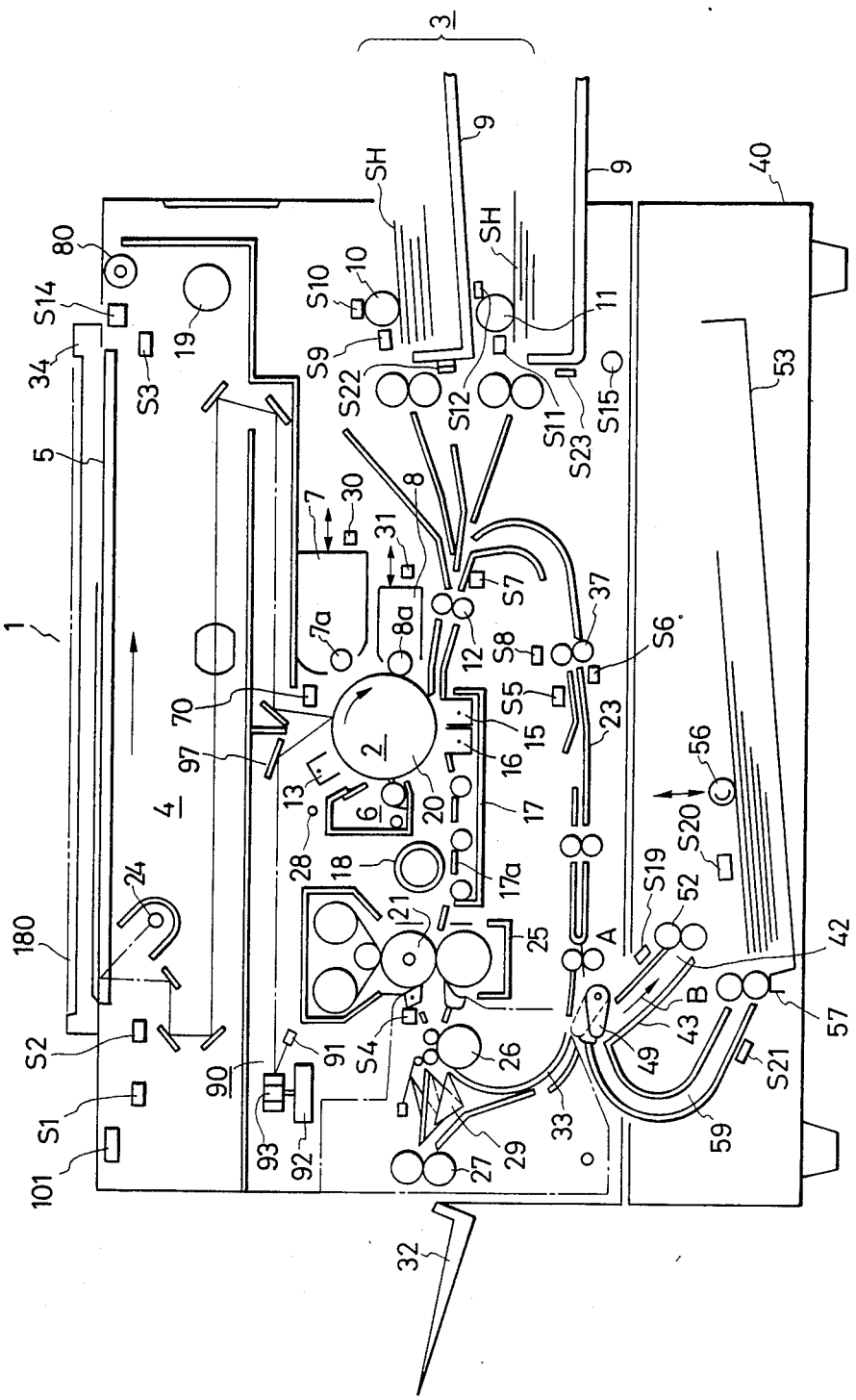
FIG. 2 is a sectional view showing an internal arrangement of a copying machine to which the present invention is applied.

FIG. 2 shows an internal arrangement of a copying machine to which the present invention is applied. Referring to FIG. 2, the copying machine includes a copying machine main apparatus 1, and an image forming unit including a photosensitive drum 20 as a major component. A first paper feed unit 3 feeds a transfer sheet (paper) SH to the interior of the main apparatus 1 and comprises a detachable cassette 9, paper feed rollers 10 and 11, and sensors S9 to S12, S22, and S23. An original scan optical system 4 serves as a main record optical system. The original scan optical system 4 includes a lens system for exposing and scanning an original and focusing an image on the photosensitive drum 20, and an original illuminating lamp 24. The original scan optical system 4 is driven by an optical motor 19 in a direction indicated by an arrow. The main apparatus 1 also includes an original glass table 5 for supporting an original thereon, an end 34 thereof, and a cleaner 6 for removing residual toner particles from the photosensitive drum 20.

A color development unit (second development unit) 7 stores a color toner such as a red toner. The unit 7 includes a development roller 7a. A black development unit (first development unit) 8 stores a black toner and includes a development roller 8a. The development units 7 and 8 are selectively brought into contact with the photosensitive drum 20 by a color development unit actuation solenoid 30 and a black development unit release solenoid 31.

First registration rollers 12 feed the transfer sheet SH from the cassette 9 or a second paper feed unit 23 to the photosensitive drum 20 at a proper timing corresponding to an image position on the photosensitive drum 20. A primary charger 13, a transfer charger 15, a separation charger 16, and a transfer unit 17 are arranged around the photosensitive drum 20. The transfer unit 17 comprises a transfer charger 15, a separation charger 16, and a paper transfer unit 17a. A main motor 18 drives the photosensitive drum 20, a fixing unit 25 incorporating a heater 21, the development units 7 and 8, and various transfer rollers.

A flapper 29 is disposed between eject rollers 26 and 27 to change a transfer path in multicopy and both side copy modes. An eject tray 32 is located outside the main apparatus. A path 33 is formed to re-feed the transfer sheet SH fixed by the fixing unit 25 to the photosensitive drum 20. Second registration rollers 37 are arranged to synchronize the feed timing for feeding the transfer sheet SH through the path 33. An interim tray 40 is used for the multicopy mode or both-side copy mode for a plurality of sheets. The interim tray 40 comprises a path outlet port 42, a transfer path 43, a path switching flapper 49, an interim tray feed roller 52, a tray 53, a feed roller 56, interim tray feed rollers 57, and a transfer path 59. A shutter 70 shields at a predetermined position an original optical image projected onto the photosensitive drum 20.

Figure 3:
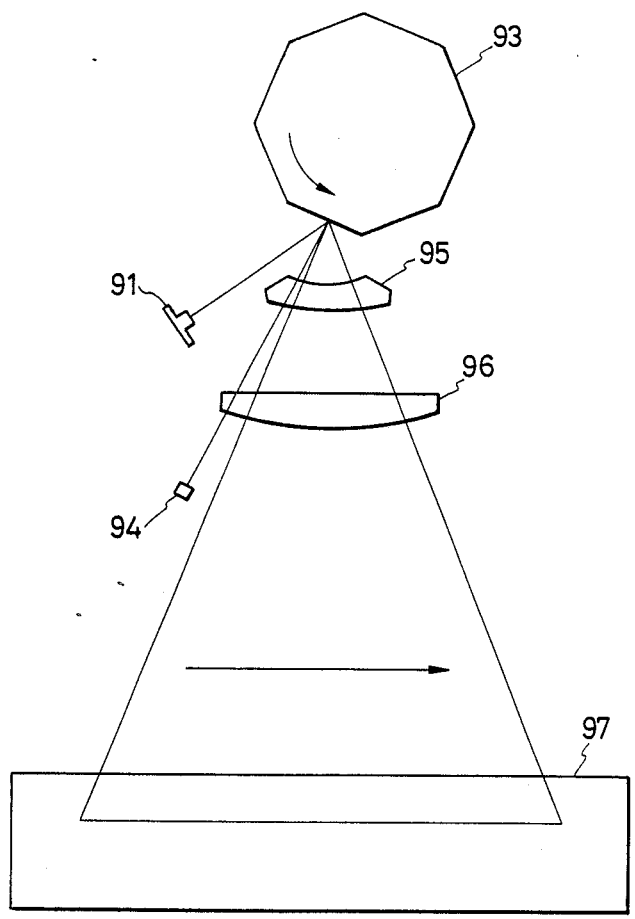
FIG. 3 is a plan view showing an arrangement of a laser unit shown in FIG. 2.

A laser unit 90 serves as a sub-record optical system (to be described later in FIG. 3). The laser unit 90 includes a laser 91, a polygonal mirror 93, a polygonal mirror drive motor 92, and a reflecting mirror 97. Referring to FIG. 3, a horizontal sync signal (BD signal) detect circuit for detecting the BD signal representing a beam scan position, a spherical mirror 95, and a toric lens 96 are shown. The laser unit 90 can erase unnecessary charge in an area (a "without area") excluding (i.e., not containing) an image area (herein sometimes termed), erase any location in the image, and write a simple character on the transfer sheet through the photosensitive drum 20. Sensors S1 to S12, S14, S15, and S19 to S23 shown in FIG. 2 will be described later.

Figure 4:
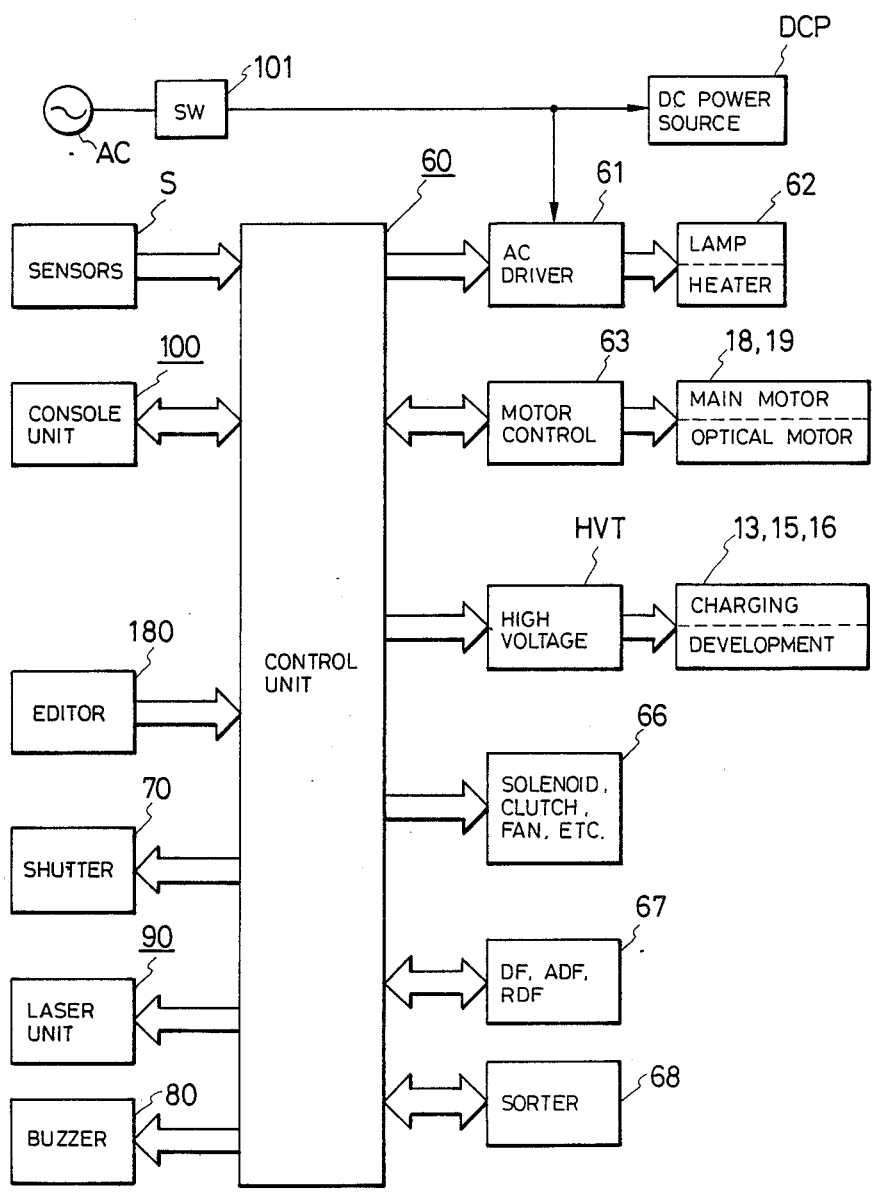
FIG. 4 is a block diagram showing a circuit arrangement of a control system shown in FIG. 2.

FIG. 4 shows a circuit arrangement of a control system for controlling the copying machine in FIG. 2.

Referring to FIG. 4, the control system includes a control unit 60 which comprises a microcomputer, a program memory, a RAM (random access memory), and a timer. An AC driver 61 controls an AC load 62 including such as the lamp 24 and the heater 21. A motor control unit 63 controls the main motor 18 and the optical motor 19. Loads 66 such as a solenoid, a clutch, and a fan are connected to the control unit 60. An original handling apparatus (DF, ADF, or RDF) 67 for performing automatic feed or other original handling and a sorter 68 are also connected to the control unit 60. An alarm buzzer 80, a console unit 100 (to be described in detail with reference to FIG. 5), and a coordinates read unit (editor) (to be described later with reference to FIG. 6) are further connected to the control unit 60. A power switch 101 is connected to a DC power source DCP to supply power to the control unit 60 and the like. The sensors S1 to S12, S14, S15, and S19 to S23 are connected to the control unit 60 to supply detection singals thereto. A high-voltage generation unit HVT applies a high voltage to the primary charger 13, the transfer charger 15, and the separation charger 16. The control unit 60 controls the above components, the shutter 70 and the laser unit 90.

An operation of the copying machine described above will be described below.

When the power switch 101 is turned on, the heater 21 in the fixing unit 25 is energized, and the control unit 60 waits until the fixing roller is heated to a predetermined temperature which allows fixing (wait state). When the temperature of the fixing roller reaches the predetermined temperature, the main motor 18 is energized for a predetermined period of time to drive the photosensitive drum 20 and the fixing unit 25, so that the roller in the fixing unit 25 is kept at a uniform temperature (wait release/rotation). Thereafter, the main motor 18 is stopped and the main unit 60 waits in a copy enable state (standby state). When a copy command is input from the console unit 100, copying is started. The speed of the main motor 18 can be switched in two steps in accordance with a command from the controller 60.

(1) Description of Image Formation

In response to a copy command, the main motor 18 is rotated and the photosensitive drum 20 is rotated in direction indicated by the arrow on the drum in FIG. 2. At the same time, a high voltage is applied from the high-voltage generation unit HVT to the primary charger 13. The photosensitive drum 20 is uniformly charged. The lamp 24 is then turned on to eliminate an image on the drum 20, and the optical motor 19 is driven. An original placed on the original glass table 5 is exposed and scanned in the direction indicated by the horizontal arrow to project an original image on the photosensitive drum 20. In this case, the laser unit 90 is used to erase an arbitrary location in the image or writes a simple document. In this manner, a latent image is formed on the photosensitive drum 20.

The latent image is developed and visualized by the development unit 7 or 8, and a toner image is transferred to the transfer sheet SH at a portion of the transfer charger 15. The transfer sheet is then separated from the photosensitive drum 20 at a portion of the separating charger 16. Residual toner particles left on the photosensitive drum 20 ar recovered by the cleaner 6. The photosensitive drum is uniformly discharged with a laser beam from the laser unit 90 capable of removing an unnecessary charge in an area excluding the image area and the illumination light from the optical system 4 capable of removing such necessary charge. Thereafter, the next copy cycle is repeated.

During the above image formation, one of the black and color development units 8 and 7 is brought into contact with the photosensitive drum 20 in accordance with a selection command from the console unit 100. The black development unit 8 is released upon energization of the black development release solenoid 31. The color development unit 7 is brought into contact with the photosensitive drum upon energization of the color development unit actuate solenoid 30. A development bias voltage is applied from the high-voltage generation unit HVT to each development roller 7a or 8a.

In the copying machine of this embodiment, both-side copy and multicopy operations can be performed in addition to a normal copy operation, i.e., a one side copy operation. The state of the transfer sheet which has passed through the fixing unit is changed from the original state. For example, the resistance of the paper is changed. In order to properly compensate for changes in paper conditions, a high voltage applied to the transfer charger 15 and the separation charger 16 during copying is varied in accordance with the obverse or reverse surface, or an order in a multicopying mode. The development bias voltages or the high-voltage value for transfer and separation is changed in accordance with a command from the control unit 60.

The optical system 4 can be reciprocally driven such that the optical motor 18 is rotated in the forward and backward directions through the motor control unit 63. A home position sensor S1 is arranged for detecting the home position of the optical system 4. The optical system 4 is stopped at the position of the home position sensor S1 in the standby state. A leading edge sensor S2 detects a leading edge of an original image and is used for timing control of a copy sequence. A limiter position (reverse position) sensor S3 is used to scan an original in a maximum size. The optical system 4 is reciprocally driven in a scanning stroke corresponding to a copy magnification and a cassette size in accordance with a command from the control unit 60.

(2) Transfer Sheet Control

FIG. 2 shows upper and lower paper detect sensors S9 and S11 arranged for the paper feed unit 3, upper and lower lifter position detect sensors S10 and S11, and upper and lower cassette size sensors S22 and S23.

The upper and lower sensors have identical operation sequences, and only paper feeding of the upper side will be described. When the cassette 9 is attached to the copying machine, the upper cassette size sensor S22 reads and discriminates the size of the cassette 9, and a "no paper" indicator in the console unit 100 is turned off to inform the user of the currently selected cassette size.

When the copy operation is started in accordance with a copy command, the mid-plate lift clutch (not shown) is turned on to lift the mid-plate in the cassette 9 so as to lift the transfer sheets SH. When the transfer sheets SH are lifted and the uppermost sheet is brought into contact with the paper feed roller 10 and reaches a predetermined height, the sensor S10 generates an output. The mid-plate lift clutch is turned off, and at the same time, the feed roller 10 is driven to feed the transfer sheet in the interior of the main apparatus 1.

After the sheets in the cassette are lifted to the predetermined height, they maintain this state. In the next copy operation, sheet lifting is not executed. When the position of the uppermost sheet is lower than the predetermined position, the clutch is turned on again in the same manner as described above, thereby lifting the sheets to the predetermined height.

The transfer sheet fed in the main apparatus reaches a first anti-registration sensor S7. In this state, since the registration rollers 12 are kept stopped, the sheet is stopped while forming a proper loop. The registration rollers 12 are driven in response to a timing signal from the sensor for the optical system 4 so as to align the sheet with the leading end of the image formed on the photosensitive drum 20. After alignment or registration is completed, the sheet is transferred to the transfer unit 17. The image on the drum 20 is transferred to the sheet by the transfer charger 15 in the transfer unit 17, the sheet is separated from the photosensor drum 20 by the separation charger 16. The transfer sheet is fed to the fixing unit 25 through the transfer unit 17a. In the fixing unit 25, the surface of the fixing roller is heated to a predetermined temperature by a temperature sensor (not shown) arranged on the surface of the fixing roller and the heater 21. The toner image on the transfer sheet is fixed by the fixing unit 25. Thereafter, ejection of the sheet is detected by the eject sensor S4, and the sheet is then ejected to the external eject tray 32 by the eject rollers 26 and 27.

The multicopy mode will be described below. In this case, the flapper 29 is switched by a solenoid (not shown) to the position indicated by the dotted line. The transfer sheet after feeding, image transfer, sheet separation, and image fixing as described above is guided to the flapper 29 and is transferred through the path 33. The sheet is then fed to the second paper feed path 23. After the second anti-registration sensor S5 detects passing of the transfer sheet, transverse registration of the sheet is performed by the paper end sensor S6, the transverse registration sensor S8, and a transverse registration solenoid in the second paper feed unit 23.

The second registration rollers 37 are rotated in accordance with a multicopy command from the console unit 100, and the transfer sheet is re-fed to the first registration rollers 12. The subsequent operations are the same as those as described above, and the transfer sheet is ejected on to the eject tray 32.

In the both side copy mode, although the transfer sheet is ejected by the eject rollers 27 in the same manner as in the normal copy operation as described above, the eject rollers 27 are rotated in the reverse direction after the trailing end of the transfer sheet passes by the flapper 29. The transfer sheet is guided to the flapper 29 and transferred to the path 33. This reverse driving is performed by a solenoid (not shown) for controlling the forward/reverse rotation. The subsequent operations are the same as those in the multicopy mode. In the both-side copy mode, the transfer sheet is temporarily ejected from the main apparatus 1 through the eject rollers 27. The side of the transfer sheet is reversed by the eject rollers 27, and the turned sheet is fed to the second paper feed unit 23.

The above description is related to the multicopy and both-side copy operations for single sheets. However, in the multicopy or both-side copy mode for a plurality of sheets, the interim tray 40 is used. As shown in FIG. 2, a tray 53 is arranged in the interim tray unit 40 to temporarily store the transfer sheets located in the transfer paths 59 and 43 and in the interim state.

In the multicopy mode for a plurality of sheets, each fixed sheet is partially ejected by the eject rollers 27 in the same manner as in the both side copy mode for a single sheet. This sheet then passes through the paths 33 and 43 upon reverse driving of the eject rollers 27 and is stored in the tray 53. This operation is repeated to store all sheets in the tray 53. Each stored sheet has an image on one surface thereof. Each sheet with an image on one surface thereof is then fed by the feed rollers 56 to the photosensitive drum 20 through the path 59 and the second paper feed unit 23. Therefore, the second copy cycle is started.

In the both-side copy mode for a plurality of sheets, the transfer sheets are guided by the flapper 29, pass through the fixing unit 25 and then the paths 33 and 43, and are stored in the tray 53 in the same manner as in the multicopy mode for a single sheet. The subsequent operations are the same as those in the multicopy mode, and detailed description thereof will be omitted.

Figure 5A:
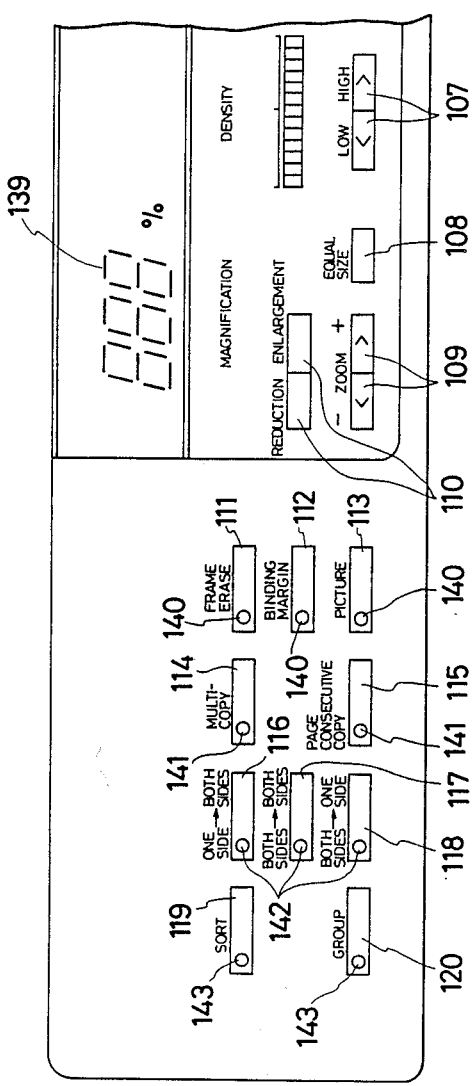
FIGS. 5A and 5B are plan views showing an arrangement of a console unit shown in FIG. 4.
Figure 5B:
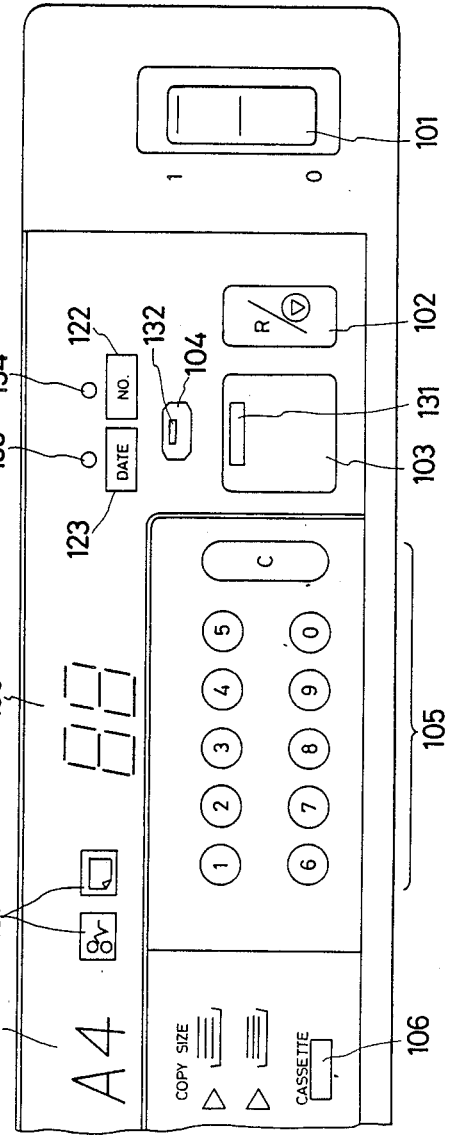

An arrangement of the console unit 100 will be described with reference to FIGS. 5A and 5B.

The console unit 100 includes a power switch 101 for energizing the copying machine, a reset/stop key 102 which serves as a copy stop key during copying and a key for restoring the standard mode in the standby state, a copy key 103, a color development unit selection key 104 for selecting the development unit 7 or 8, and a ten-key pad 105 for entering mainly the number of copies to be set.

The console unit 100 also includes a key 106 for selecting the cassette 9, a copy density adjust key 107, a key 108 for selecting an equal-size copy operation, a zoom key 109 for designating a predetermined magnification by 1%, for example, a fixed magnification key 110 for designating a fixed reduction or enlargement coefficient, a key 111 for designating frame erasure of a copy sheet, a key 112 for designating a binding margin at one end of a copy sheet, and a key 113 for designating a picture mode.

The console unit 100 also includes a multicopy key 114 for designating the multicopy mode, a page consecutive copy key 115 for dividing a copy area of the original glass table 5 into two regions and designating a consecutive copy mode for automatically copying two images, keys 116 to 118 for selecting the both side copy mode, keys 119 and 120 for designating an operation mode of the sorter 68, and keys 122 and 123 for designating a mode for writing predetermined character data in a copy image. The key 122 designates to write numbers, and the key 123 designates to write data.

Indicators and/or displays 131, 132, 134 to 143 comprise respective LEDs (light-emitting diodes). More specifically, these indicators are the standby indicator LED 131 which is turned on in green in a copy enable state and red in a copy disable state, the color image indicator LED 132 which is turned on when the development unit selection keys 104 is depressed and the color development unit 7 is selected, the number write mode indicator 134, the date write mode indicator 135, the display 136 for displaying the set number of copies, the alarm indicator 137 for indicating the absence of transfer sheets and jamming, the cassette size indicator 138 for indicating a selected cassette size, and a magnification display 139 for displaying a copy magnification.

The indicators 140 to 143 are the frame erase, binding margin and picture mode indicators 140, the multicopy and page consecutive copy mode indicators 141, the both-side copy mode indicators 142, and the sorter and group mode indicators 143 for indicating the operation modes of the sorter 68.

An arrangement of the editor 180 will be described with reference to FIG. 6.

Figure 6:
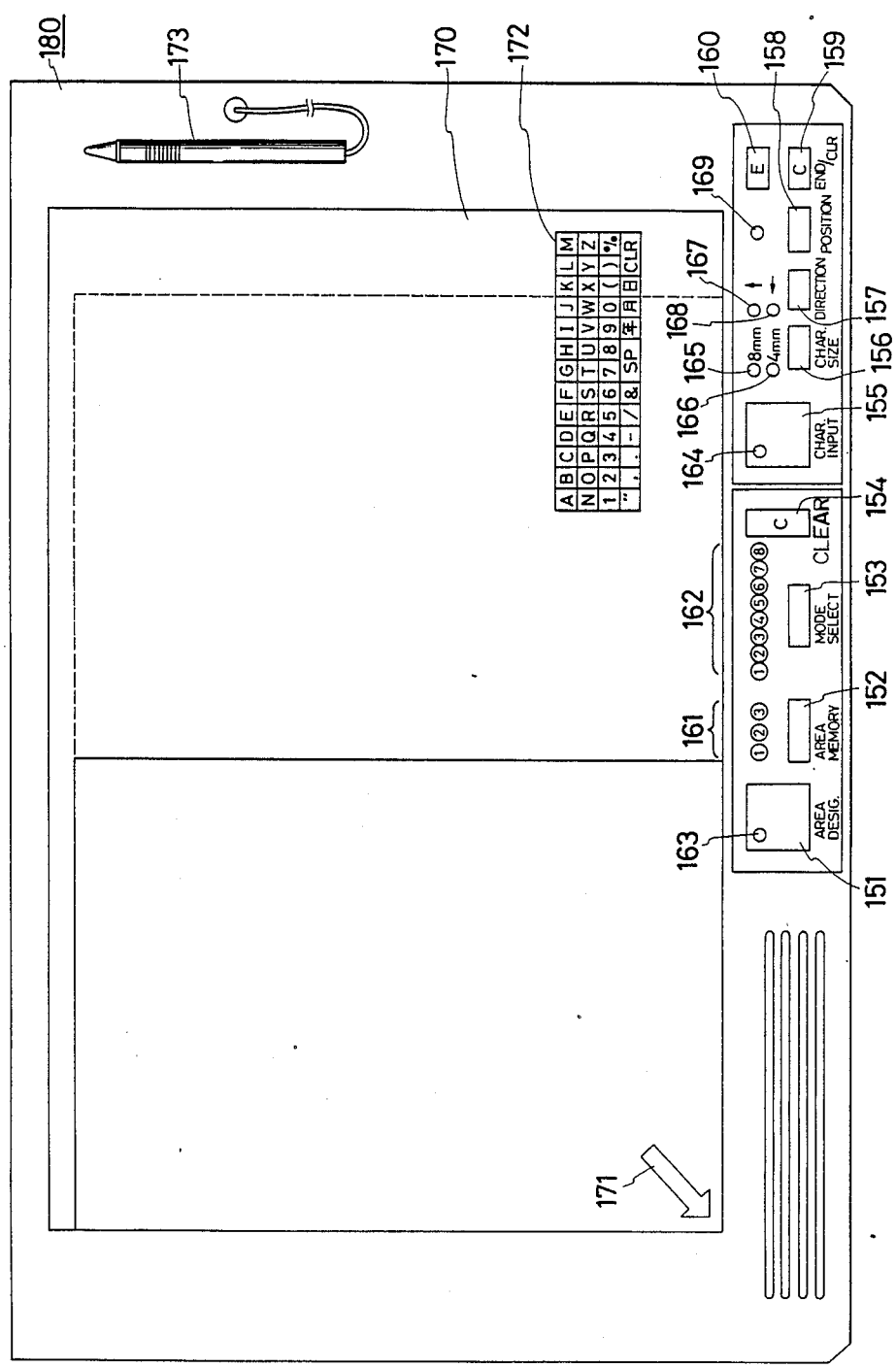
FIG. 6 is a plan view showing an arrangement of an editor shown in FIG. 4.

The editor 180 also serves as an original holding plate for holding an original, and FIG. 6 shows an outer appearance of the editor 180. The editor 180 includes an original set surface 170 (to be referred to a coordinates input panel hereinafter) for supporting an original an area of which is to be designated, a reference mark 171 which is abutted by the original end, a key 151 for designating an area designate mode, a key 152 for storing a designated area, a mode select key 153 for copying the designated area by selectively using the two development units 7 and 8, a clear key 154 for clearing the area designate mode, and an area designate mode indicator 163. The editor 180 further includes indicators 161 for indicating designated areas (three areas in this embodiment), and LEDs 162 for indicating a copy mode of the designated areas in combination with the color development unit 7. The LEDs are sequentially turned on by the mode select key 153.

The editor 180 further includes a character input key 155 for designating an add-on mode (character input mode) for writing symbols such as characters in the copy image, a character size key 156 for designating a size of an input character (the character having a size of 8 mm or 4 mm can be designated in this embodiment), a character direction key 157 for designating a direction of an input character (a vertical or horizontal direction can be designated in this embodiment), a position key 158 for designating a start position of the input characters, a key 160 for designating an end of the character input, and a clear key 159 for clearing the character input mode.

The editor 180 includes a character input mode indicator 164, indicators 165 and 166 for indicating character sizes, respectively, indicators 167 and 168 for indicating the character input directions, respectively, an indicator 169 for indicating the end of the position input, and a stylus pen 173 for designating an area and inputting data to be written by depressing the coordinates input panel 170 with the stylus pen 173. A character input area 172 is used to designate character data with the stylus pen 173.

An operation of the editor 180 will be described below.

Figure 7:
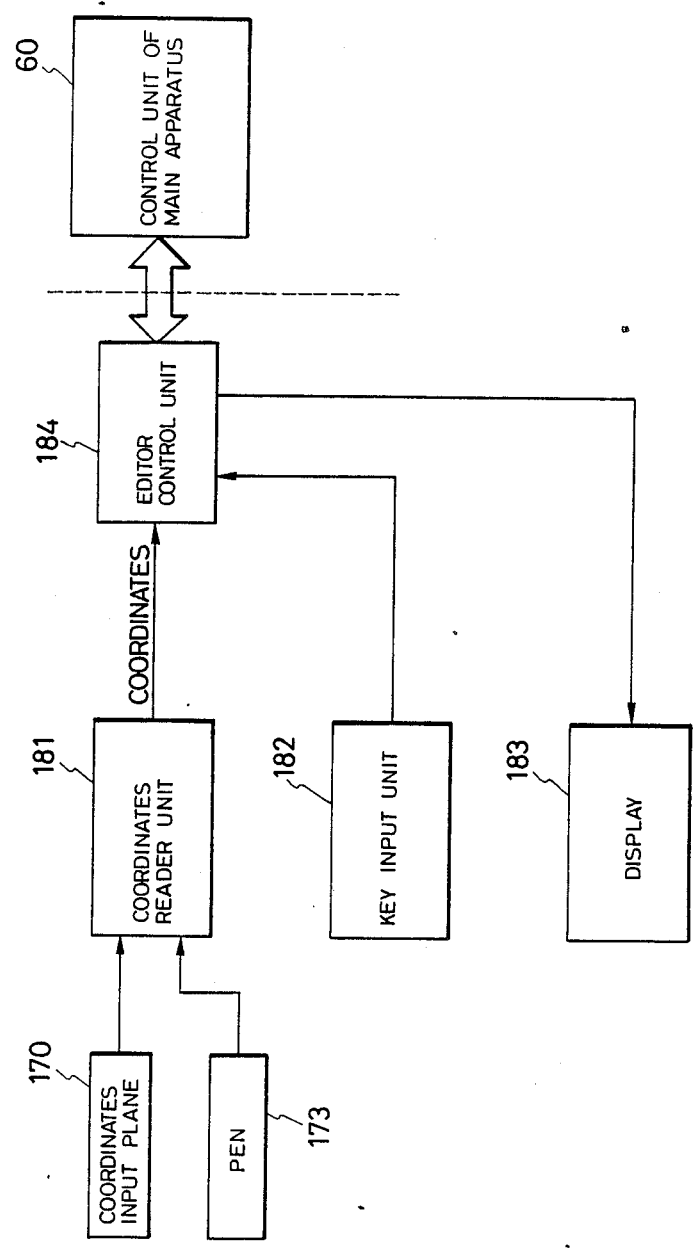
FIG. 7 is a block diagram showing a circuit arrangement of the editor shown in FIG. 6.

FIG. 7 shows an arrangement of an internal control circuit in the editor 180. A coordinates reader unit 181 reads coordinates of a position depressed with the stylus pen 173 when an area in the document placed on the coordinates input panel (the original set surface) 170 is depressed with the stylus pen 173. The read coordinates are supplied to an editor control unit 184. The editor control unit 184 controls the coordinates input according to the control sequence shown in FIGS. 8 and 9 or various modes upon reception of various key inputs and coordinates. The editor control unit 184 also controls displays (indicators) 183 on the editor 180.

Control operations in the area designate mode and the character input mode in the editor control unit 184 will be described below.

(1) Area Designation Mode

Figure 8:
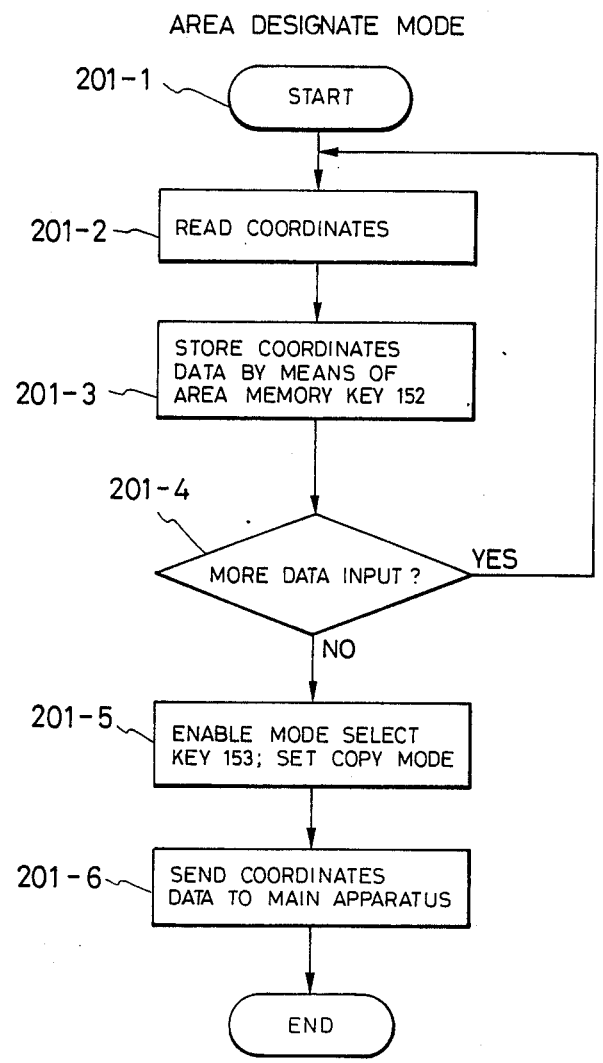
FIG. 8 is a flow chart showing an area designation operation of an editor control unit in FIG. 7.

FIG. 8 is a flow chart showing a control operation of the editor control unit 184 in the area designate mode. When the area designate mode key 151 is depressed, the area designate mode LED 163 is turned on to set the area designate mode (step 201-1). When the coordinate input panel 170 is depressed by the stylus pen 173, the coordinates of the depressed position are read. At this time, coordinate values of two points allow reading of a rectangular area having a diagonal line defined by the two input points. For this reason, the coordinates of the two points are read (step 201-2), and the coordinate values read as a first area are stored by a key input with the area memory key 152, and at the same time, the area LED 161-1 is turned on (step 201-3). When an additional coordinates input is detected (step 201-4), the above operation is repeated to store the input coordinate values as the second area. The area LED 161-2 is turned on.

The mode select key 153 is operated to set a copy mode (step 201-5). In this embodiment, eight copy modes are available as follows:

1  Mode for copying the designated area ("within" area) in black;
2  Mode for copying the designated area in a designated color;
3  Mode for copying an area ("without" area) outside the designated area in black;
4  Mode for copying an area outside the designated area in a designated color;
5  Mode for copying the designated area in black and an area outside the designated area in a designated color;
6  Mode for copying the designated area in a desired color and an area outside the designated area in black;
7  Mode for copying the designated area with dots of a designated color and superposing a normal copy thereon; and
8  Mode for copying the designated area with black dots and superposing a normal copy thereon.

Modes 5 to 7 are set when the black and color copy modes are set in the multicopy mode. In step 201-5, these modes are sequentially selected to set a desired mode. The coordinates data (including the number of areas) obtained in steps 201-3 and 201-5 and the copy mode data are supplied to the control unit 60 (201-6).

(2) Character Input Mode (Addon Mode)

Figure 9:
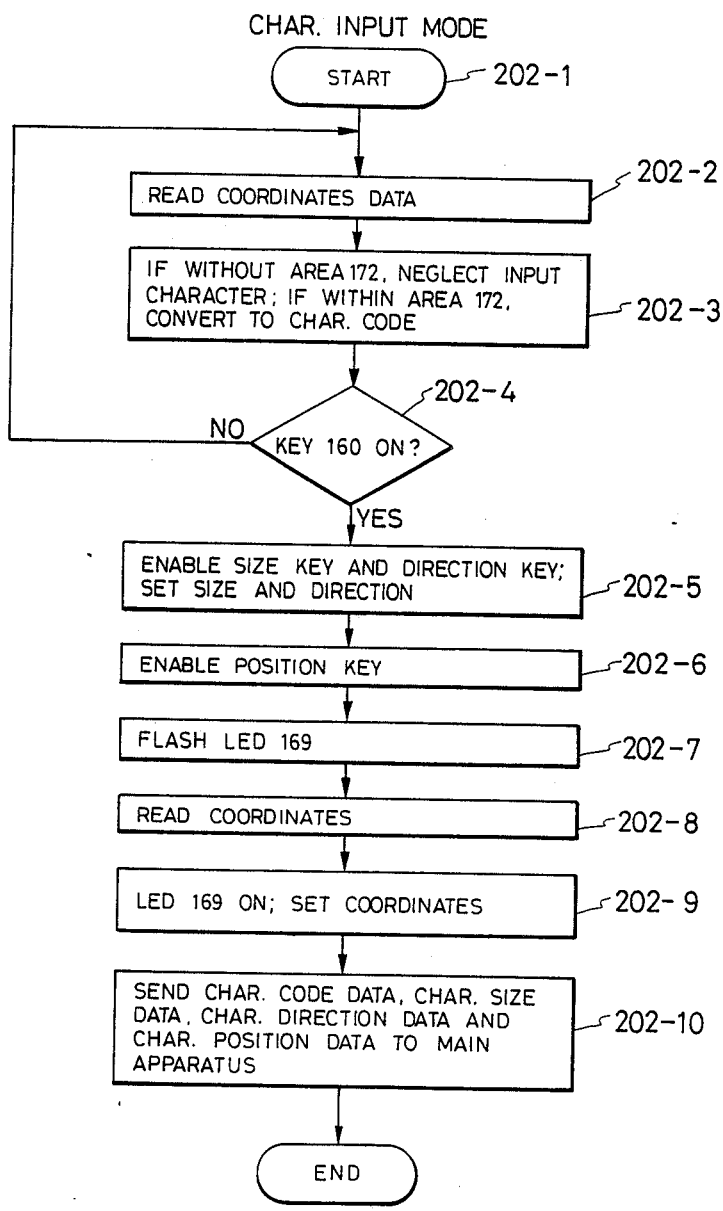
FIG. 9 is a flow chart showing a character input operation in the editor control unit shown in FIG. 7.

The flow chart in FIG. 9 shows a control operation of the editor control unit 184 in the character input mode. When the character mode key 155 is depressed, the character input LED 164 is turned on to set to character input mode (step 202-1). When the coordinates input panel 170 is depressed by the stylus pen 173, coordinates of the depressed position are read (step 202-2). Subsequently, the editor control unit 184 determines whether the read coordinates fall within the character input area 172. If the input coordinate values fall outside the character input area 172, the character input is neglected. However, if the input coordinate values are determined to fall within the character input area 172, they are determined to be character data and this character data is converted into a character code (step 202-3).

The control unit 184 then determines in step 202-4 whether the character end key 160 is depressed. If not, the character data continues to be read until the character input end key 160 is depressed. When the character input end key 160 is depressed, key inputs from the size key 156 and the direction key 157 can be accepted. When the corresponding data are input, the corresponding LEDs 165 to 168 are turned on and the data corresponding to these keys are set in step 202-5.

When the start position input key 158 is depressed in step 202-6, the corresponding LED 169 flashes, and at the same time, the corresponding coordinates are read (step 202-8). When the coordinate input panel 170 is depressed by the stylus pen 173, the LED 169 is turned on, and at the same time coordinates of the depressed point are set as the character input start position (step 202-9). Thereafter, the character code, the character size data, the character direction data, and the character write position data are sent in step 202-10.

Various copy modes using the laser unit 90 will be described below. In the following description, an image obtained in the normal original copy mode is an analog image, and an image obtained by writing binary data with a laser is a digital image.

In this embodiment, the following copy modes are performed while erasing unnecessary charges outside the image area by the laser unit 90.

(1) Area Designate Copy Mode

Figure 10:
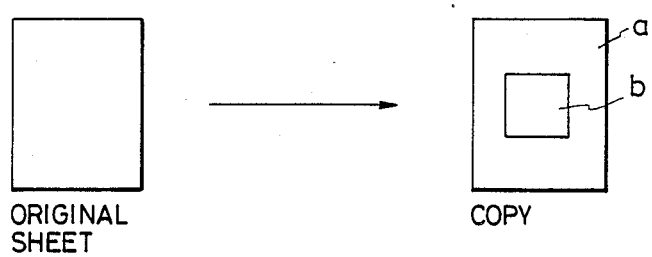
FIG. 10 is a view showing a copy output in area designation.

Eight modes are available in this copy mode as described with reference to the editor 180. FIG. 10 shows a copy result in the area designate copy mode. Areas a and b can be copied in combination between a designated color and a black together with image erasing in accordance with each of the eight modes. In the dot mode, an image in the area a can be copied as a dot or halftone image in a designated color or black in accordance with the digital image. The areas a and b can be copied to form analog images.

(2) Simultaneous Copy Mode of Digital (Character) and Analog Image

Figure 11A:
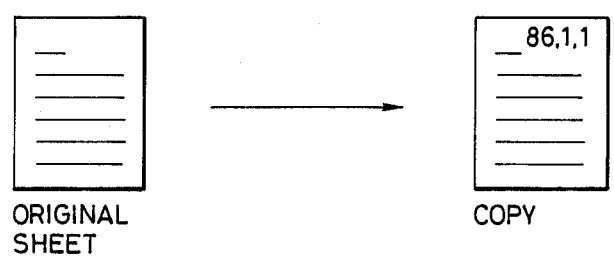
FIGS. 11A to 11D are views for explaining copies in a digital and analog image simultaneous copy mode.
Figure 11B:
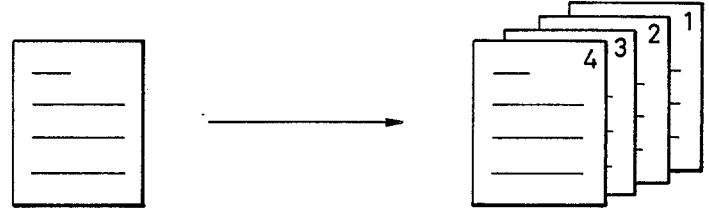

This mode allows formation of copies shown in FIGS. 11A and 11B. A digital image is copied (recorded) in a predetermined area indicated by hatched lines in FIG. 11C.

FIG. 11A shows a mode in which the date write mode LED 135 is ON. In this mode, the normal analog image copy operation is started from the beginning. At the same time, the shutter 70 is operated by a solenoid (not shown) so that an end portion of an original optical image projected from the original onto the photosensitive drum 20 through the optical system is shielded by an area indicated by the hatched lines in FIG. 11C. In the portion indicated by the hatched lines, a digital image (date) is written using the laser 90.

FIG. 11B shows a mode in which the number write mode LED 134 is ON. The image formation sequence in this mode is the same as that in FIG. 11A. Numbers as digital images are sequentially written in a copy.

(3) Multicopy Mode of Digital Image

Figure 11C:
Figure 11D:
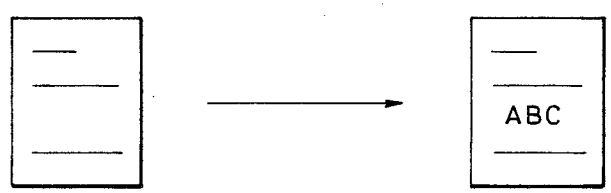

This mode is shown in FIG. 11D. An image is obtained by mixing analog and digital images in the multicopy mode. More specifically, an original is set on the original table and a character input is designated with the editor 180. When the copy key 103 is depressed, the character at the position designated with the editor 180 is copied, and then the normal analog copy operation is performed. In this case, analog copy operation may be performed first.

The above modes may be used in combination.

The second paper feed unit 23 and the interim tray unit 40 which are used in the both side copy/multicopy mode will be described below. In this embodiment, in order to set the both-side copy or multicopy mode, a transfer sheet re-feed mechanism comprises two systems. One comprises the second paper feed unit 23, and the other comprises the interim tray 40. These systems can be selectively used in accordance with a selected copy mode.

The proper system is selected in accordance with a transfer sheet size and the number of copies, as shown in a copy program (to be described later) shown in FIG. 12. The second paper feed unit 23 is an indispensable unit for the both side copy and/or multicopy mode. Since the transverse registration can be easily performed with the second paper feed unit 23 by a mechanism (to be described later), the paper size is not fixed. Two or more sheets cannot be stored in the paper feed unit 23. Although a plurality of sheets can be stacked in the interim tray 40, transverse registration can be performed for only the fixed size.

The control sequence for selecting a proper paper path in the both side copy/multicopy mode will be described with reference to the flow chart in FIG. 12.

When the copy operation is started in accordance with a copy command upon operation of the copy key 103, whether copying of the same original is performed in the both-side copy/multicopy mode is determined in step 270-1. For example, when a predetermined portion of one original is copied in a designated color, and the remaining portion thereof is copied in black, YES (affirmative determination) is obtained. If YES in step 270-1, whether the original has a regular size is determined in step 270-2. If NO in step 270-2, the flow advances to step 270-5, and the second paper feed unit 23 is unconditionally selected. However, if YES in step 270-2, the flow advances to step 270-3, and whether the set number of copies is one is determined in this step. If YES in step 270-3, the flow advances to step 270-5. However, if NO (negative determination), whether the set number of copies is larger than 30 (i.e., the maximum number of copies stored in the interim tray 40) is determined in step 270-4. If YES in step 270-4, the flow advances to step 270-5. However, if NO in step 270-4, the flow advances to step 270-8. In step 270-5, one sheet (paper) is copied, and the copied sheet is set in the second paper feed unit 23. The sheet is re-fed from the second paper feed unit 23 in step 270-6, copied, and then ejected from the copying machine.

Whether copying for the number of copies set at the ten-key pad 105 is completed is determined in step 270-7. If NO in step 270-7, the operation loop of steps 270-5, 270-6, and 270-7 is repeated until the end of copying. When the number of copied sheets is equal to the set number of copies, this routine is ended.

On the other hand, when the flow advances from step 270-4 to 270-8, the copy operation is performed using the interim tray 40. More specifically, copying is performed by the set number of copies in step 270-8, and the copied transfer sheets are set in the interim tray 40. The sheets are then re-fed from the interim tray 40 to the photosensitive drum 20 and copying is performed by the set number of copies. The copied sheets are ejected from the copying machine and this routine is ended.

If NO in step 270-1, the flow advances to step 270-10. Whether the original has a regular size is determined in step 270-10. If NO in step 270-10, the set number of copies is set to be 1 in step 270-17, and the flow advances to step 270-18. If YES in step 270-10, whether the set number of copies is 1 is determined in step 270-11. If YES in step 270-11, the flow advances to step 270-18, and the second paper feed unit 23 is selected.

If NO in step 270-11, the interim tray 40 is selected, and the number of copies is determined in step 270-12. If the number of copies is 30 or more, the number of copies is set to be 30 in step 270-13, and the flow advances to step 270-14. Otherwise, the flow advances to step 270-14.

The sheets (paper) are copied by the set number of copies in step 270-14 in the same manner as in step 270-8, and the copied sheets are set in the interim tray 40.

The original is changed by another one in step 270-15. When a copy command is output, copying is performed in step 270-16 in the same manner as in step 270-9, and this routine is ended.

When the second paper feed unit 23 is selected, copying is performed in step 270-18 in the same manner as in step 270-5. The original is changed by another one in step 270-19. Copying is performed in step 270-20 in the same manner as in step 270-6, and this routine is ended.

In this embodiment, when copying is performed for a size excluding the regular size, i.e., when a sheet is fed from a universal cassette or during one-sheet copying, the sheet is not fed to the interim tray 40 but directly to the second paper feed unit 23. The sheet is then re-fed from the second paper feed unit 23. However, when a plurality of sheets having a fixed size are to be copied, they are temporarily stacked in the interim tray 40 and are fed to the second paper feed unit 23. The sheets are re-fed from the second paper feed unit 23.

Figure 12:
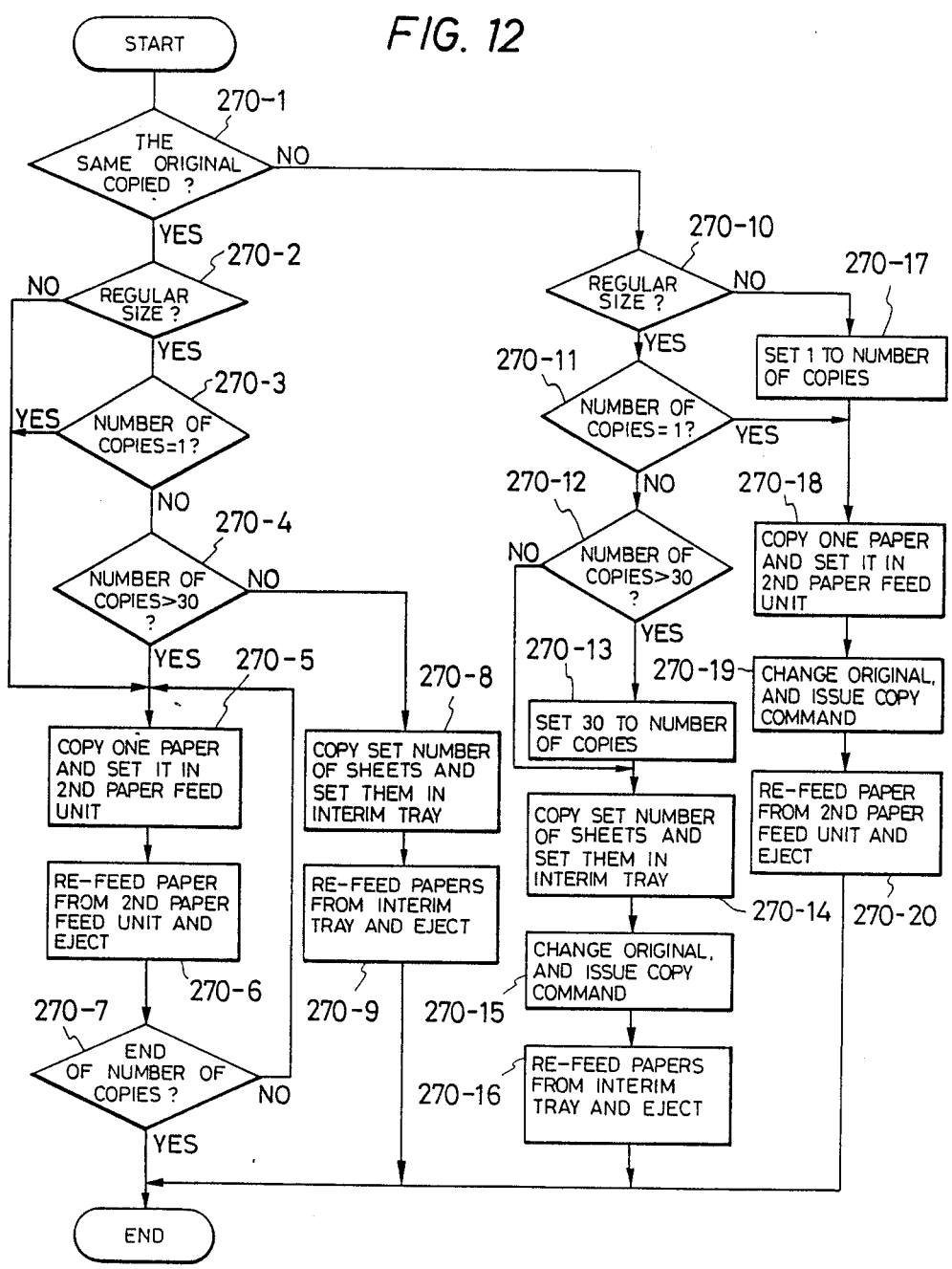
FIG. 12 is a flow chart showing a control sequence in a both side copy/multicopy mode.

Selection of one of the two systems described above is not determined by the user but automatically by the sequence program shown in FIG. 12. The operator is not confused with selection of such a system, and control can always be performed by an optimal system. When a plurality of sheets having a size excluding the regular size are to be copied, it is possible to copy the originals one by one by the second paper feed unit 23 without using the interim tray 40. Inconvenience (e.g., an excessively small paper size) of the transfer sheet can be discriminated, the both-side copy/multicopy mode is not set, and the sheet can be ejected from of the copying machine, thereby preventing unnecessary trouble.

The constituting components of this embodiment will be described in detail with reference to timing charts in FIGS. 13 to 22.

Figure 13:
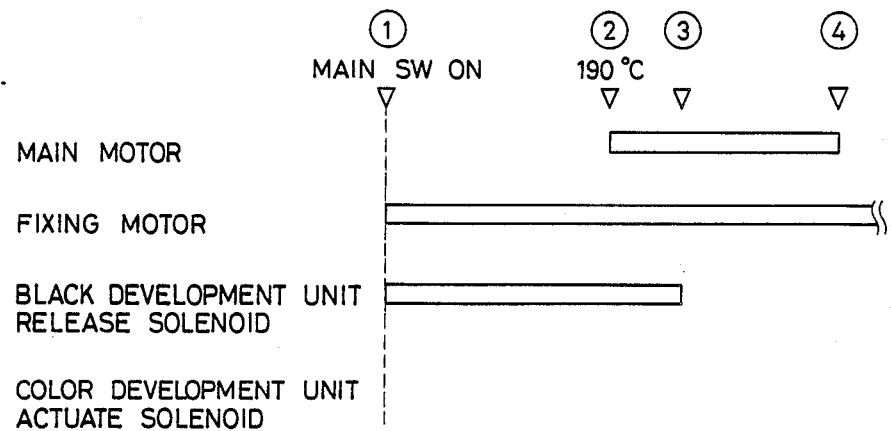
Figure 14:
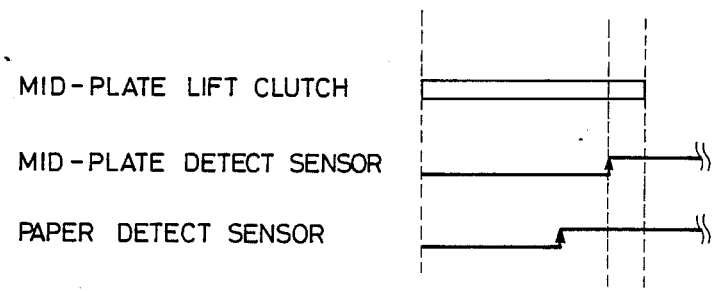

FIG. 13 is a timing chart of a power-on operation. When the main switch (power switch) 101 is turned on, the fixing heater 21 and the black development unit release solenoid 31 are turned on. When the fixing unit temperature reaches 190° C., the main motor 18 is rotated. Within one second ( 3 ) upon rotation of the main motor 18, the black development unit actuate solenoid 32 is turned off. The black development unit 8 is moved to the release position and then comes close to the photosensitive drum 20. When the photosensitive drum 20 is rotated one revolution, the main motor 18 is stopped. At the start ( 2 ) of rotation of the motor 18, if the mid-plate in the cassette 9 in the paper feed unit 3 is set in the lower position, the mid-plates of the upper and lower cassettes are moved upward, as shown in FIG. 14. When lifting of the mid-plates is completed, the main motor 18 is stopped ( 4 ).

FIG. 14 is a timing of mid-plate lifting. The timing for the upper cassette is the same as that for the lower cassette. When the mid-plate lift clutch (not shown) is turned on, the mid-plate in the cassette 9 is gradually moved upward. When an output from the mid-plate detect sensor (not shown) is set at logic "1", the mid-plate lift clutch (not shown) is turned off after 0.1 second. The paper defect sensors S9 and S11 are arranged to detect the presence of sheets by moving the mid-plates upward. If the sheets are present, an output from each paper detect sensor is set at logic "1" before the output from the mid-plate detect sensor is set at logic "1". An output from the paper detect sensor is detected when the mid-plate detect sensor is set at logic "1". If the output from the paper detect sensor is kept at logic "0", the indicator 137 in the console unit 100 is turned on. However, if the cassette 9 is not attached to the main apparatus 1, the above operation cannot be performed.

The copy operation will be described below. FIG. 15A is a timing chart for the copy operation. When the copy key 103 is depressed, the main motor 18, the high-voltage generation unit HVT, and the original handling apparatus 67 are turned on. Paper feed and development unit actuating operations (both will be described in detail later) are started. After the photosensitive drum 20 is rotated about one revolution, the optical system 4 is moved forward. The registration rollers 12 are turned on after t1 upon detection of the leading edge of the image by the leading edge sensor S2. Thereafter, the registration rollers 12 are stopped after a predetermined period of time determined by the paper size. When the optical system 4 is located at the reverse position, it is moved backward. When the optical system 4 returns to the home position, the optical system 4 is stopped, and the drum 20 is rotated in the reverse direction. After the transfer sheet is ejected out from the copying machine, the main motor 18 is stopped. If a color copy operation is performed, the development unit is actuated (to be described later). The lamp 24 will also be described later.

The development unit actuating operation will be described below. FIG. 15B shows a timing when a color copy operation is started from a state wherein the black development unit 8 is set. The black development unit release solenoid 31 is turned on to release the black development unit 8 from the photosensitive drum 20. Upon completion of the release of the unit 8, the color development actuate solenoid 30 is turned on to set the color development unit 7 on the drum 20. When the color copy operation is completed, the color development unit actuate solenoid 30 is turned off to release the color development unit 7.

In this case, the black development unit 8 is kept released due to the following reason. In order to smoothly supply the color toner, the black development 8 is separated from the drum 20 at the end of color copying (see ii). When black or color copying is started from this state, both the development units 7 and 8 are kept released. After the black copy operation is completed, the black development unit 8 is kept set on the drum 20.

Figure 16:
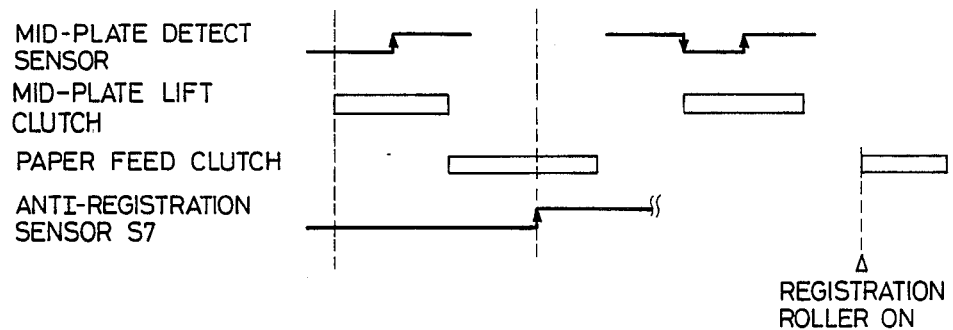

The paper feed operation will be described below. FIG. 16 shows a timing of paper feeding. When an output from the mid-plate detect sensor is set at logic "0" at the start of copying, the mid-plate is lifted as described with reference to FIG. 14. Upon completion of mid-plate lifting, the paper feed clutches for the paper feed rollers 10 and 11 are turned on, and the transfer sheet is fed. Thereafter, when the transfer sheet reaches the anti-registration sensor S7, an output from the anti-registration sensor S7 goes to logic "1". When a predetermined period of time has elapsed, the paper feed clutch is turned off. Therefore, the transfer sheet abuts against and stops at the registration rollers 12 while the sheet forms a loop.

Thereafter, when the copying operation progresses, the paper feed clutch is turned on within a predetermined period of time upon the ON operation of the registration rollers 12, thereby reducing the paper feed load of the registration rollers 12. Thereafter, the mid-plate is controlled in asynchronism with the copying operation. The mid-plate lift clutch is turned on when the output from the mid-plate detect sensor goes to logic "0". When a period of 0.1 sec has elapsed after the output from the mid-plate detect sensor goes to logic "1", the mid-plate lift clutch is turned off. The presence/absence of the cassette 9 is always monitored. When the cassette 9 is detached from the main apparatus, lifting of the mid-plate is immediately interrupted.

Figure 17:
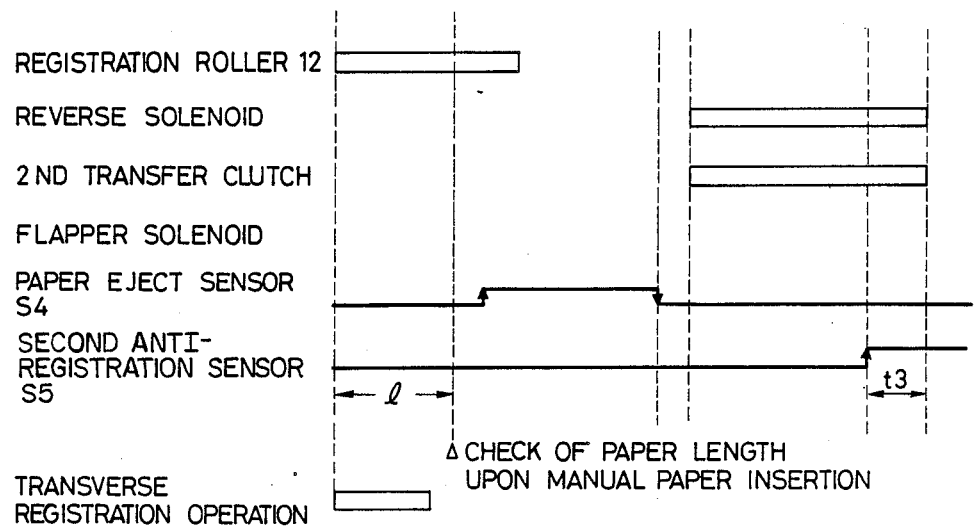
Figure 18:
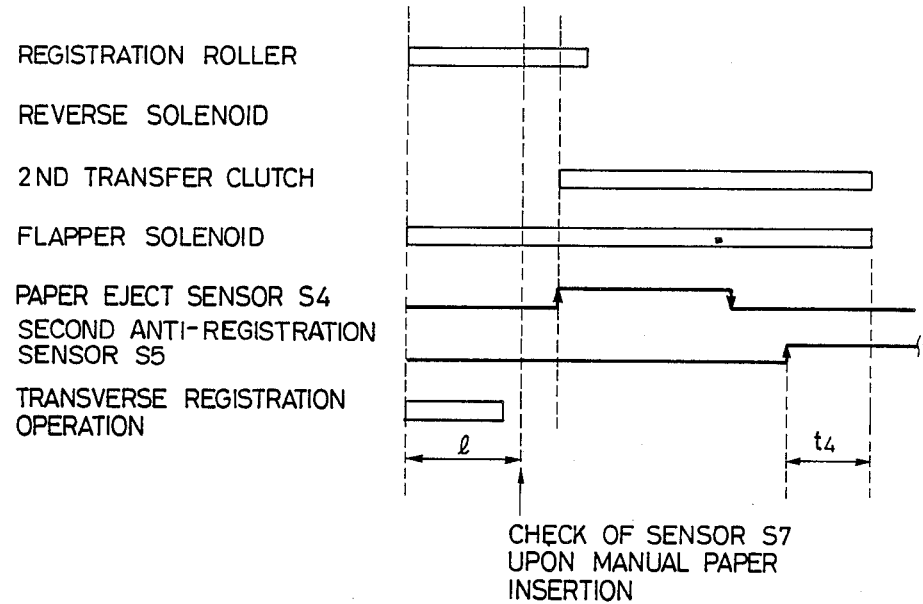

First-page copying of the both side copy mode for single sheets will be described below. The operations of the high-voltage generation unit HVT, the original handling apparatus 67, and the optical system as well as paper feed operation are the same as described above. Feeding of the transfer sheet upon rotation of the registration rollers 12 will be described below. FIG. 17 shows a timing of transfer sheet feeding. The transfer sheet SH is fed to the fixing unit 25 upon rotation of the registration rollers 12. When the transfer sheet SH passes by the eject sensor S4, an output from the eject sensor S4 is change in a sequence of 0, 1, and 0. At this time, a transverse registration means (to be described later) (second registration rollers 37) is moved to the home position.

When a predetermined period of time has elapsed and a portion of the transfer sheet which is away by about 10 mm from the trailing end of the sheet is clamped between the eject rollers 27, the reverse solenoid is turned on to feed the sheet backward. In this case, the second transfer clutch is also turned on. The transfer sheet is transferred to the second paper feed unit 23, and an output from the second anti-registration sensor S5 goes to logic "1". When another predetermined period of time has elapsed upon the logic level change of this output, the second transfer clutch is turned off. Therefore, the transfer sheets abuts against the second registration rollers and stops while forming a loop of about 15 mm.

In this case, the reverse solenoid is also turned off. The second paper feed unit 23 can feed only a transfer sheet having a length of about 180 mm or more. When a universal cassette whose sheet size is unknown is used, an input from the anti-registration sensor S7 is detected after a time interval corresponding to a distance $l = 180$ mm $- 24$ mm (a distance between the anti-registration sensor S7 and the registration rollers 12 is 24 mm) upon the energization of the registration rollers 12. If no sheet is detected, the sheet size is determined to be 180 mm or less. In this case, a switch-back operation is not performed and the transfer sheet is ejected from the main apparatus. However, if the sheet is detected, it has a size of 180 mm or more and predetermined operations are performed.

The first copy cycle in the multicopy mode for single sheets will be described below. Feeding of the transfer sheet upon ON operation of the registration rollers 12 will be described with reference to the timing chart of FIG. 18. When the registration rollers 12 are turned on, the solenoid of the flapper 29 is turned on to start moving the transverse registration means (second registration rollers 37) (to be described in detail later) to the home position. When the transfer sheet SH is moved by the distance L, the output from the anti-registration sensor S7 is checked in a manual paper insertion mode. If no sheet is detected, the solenoid of the flapper 29 is turned off, and the sheet is ejected from the main apparatus.

When the transfer sheet is fed and the output from the paper eject sensor S4 goes to logic "1", the second transfer clutch in the second paper feed unit 23 is turned on. When the transfer sheet is transferred to the second paper feed unit 23 and when a predetermined period of time t4 has elapsed upon the logic level change in output of the ante-second registration sensor S5 to logic "1", the second transfer clutch is turned off. The transfer sheet abuts against and stops at the second registration rollers 37 while forming a loop. Unlike in the both-side copy mode, the curling state of the transfer sheet and its direction are different. The time t4 for stopping the second transfer clutch after the output from the ante-second registration sensor S5 goes to logic "1" is different from that in the both-side copy mode.

Figure 19:
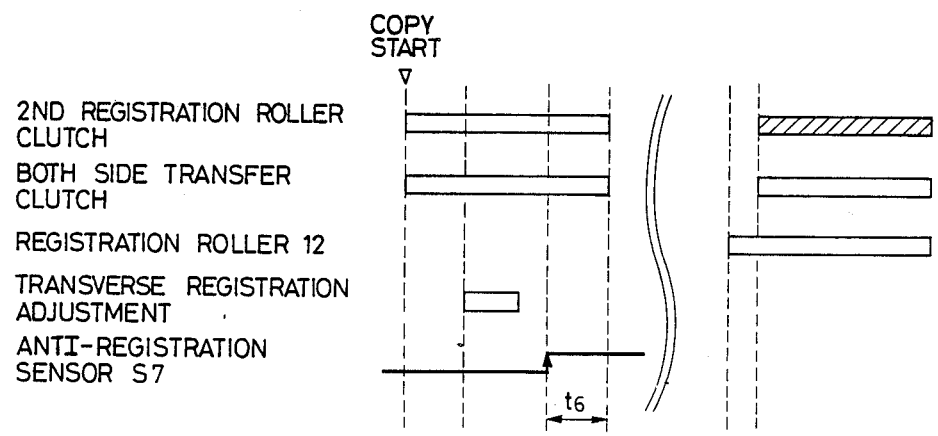

The second copy cycle in the both-side copy/multicopy mode for single sheets will be described with reference to FIG. 19. The transfer sheet has located in the second paper feed unit 23 and is stopped at the second registration rollers 37 while forming a loop. When copying is started, a clutch for the second registration rollers 37, and a both-side transfer clutch are turned on. The transfer sheet is moved toward the first registration rollers 12. After 0.1 sec. upon movement of the transfer sheet, transverse registration adjustment is started while a transfer sheet portion which is away by 17 mm from the leading end thereof is clamped between the second registration rollers 37.

When a time t6 has elapsed after an output from the anti-registration sensor S7 goes to logic "1", the clutch for the second registration rollers 37 and the both side transfer clutch are turned off. For this reason, the transfer sheet abuts against and stops at the second registration rollers 37 while forming a loop. Thereafter, the optical system 4 is moved forward and a timing for turning on the registration rollers 12 reaches. When the transfer sheet is fed by about 5 mm, both the clutch for the second registration rollers 37 and the both-side transfer clutch are turned on in the both-side copy mode. The transfer sheet is fed while the loop is reduced by 5 mm.

In the multicopy mode, however, only the both-side transfer clutch is turned on, and the transfer sheet is pulled by the registration rollers 12. In this case, the second registration rollers 37 serve as a load, so that the transfer sheet is transferred while a loop amount is zero. Thereafter, the transfer sheet is ejected from the main apparatus through the fixing roller, and the copy operation is completed. The time t6 for determining a loop amount in anti-registration varies depending on the image transfer conditions unlike in paper feed from the cassette 9.

An operation for setting the second registration rollers 37 at the transverse home position will be described below. The second registration rollers 37 can swing such that a driving force of the main motor 18 is transmitted through a spring clutch to turn on a transverse registration solenoid. There are provided a transverse registration home sensor for detecting the position of the second registration rollers 37 and the transverse registration paper sensor S8 for detecting a transfer sheet clamped between the second registration rollers 37.

The second registration rollers 37 are reciprocally moved along the axial direction of the photosensitive drum 20. In order to improve stop precision, the second registration rollers 37 are stopped by movement from one direction. As shown in the timing chart of FIG. 20-1, if an output from the transverse registration home sensor is at logic "1", the second registration rollers 37 are stopped when the sensor output is changed in a sequence of 1, 0, and 1. However, if the output is set at logic "0", the second registration rollers 37 are stopped when the output from the transfever registration home sensor is changed from 0 to 1.

Figures 1, 20:
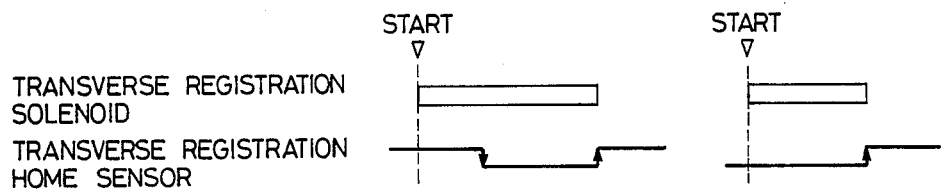
Figures 2, 20:
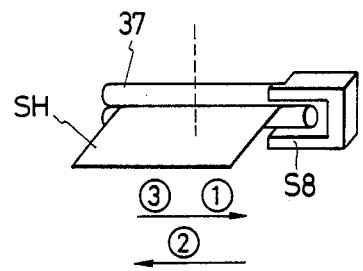
Figures 3, 20:
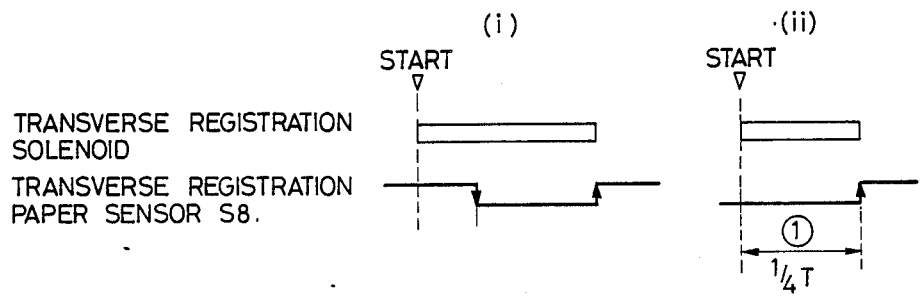

The transverse registration adjustment operation will be described below. FIG. 20-2 shows the positional relationship between the second registration rollers 37, the transverse registration paper sensor S8, and the transfer sheet. When the second registration rollers 37 are set at the home position, they are stopped at the central point in the operating range. When the transverse registration solenoid is turned on, the second registration rollers 37 swing in the sequence of arrows ①, ②, ③, and ①. When the transfer sheet SH is inserted between the second registration rollers 37 while these rollers 37 are stopped at the home position, the transverse registration paper sensor S8 detects or does not detect the sheet in accordance with the insertion position of the transfer sheet SH.

A case will be described in which the sensor S8 detects the transfer sheet. As shown in FIG. 20-3(i), the transverse registration solenoid is turned off when an output from the transverse registration paper sensor S8 is changed in an order of 1, 0, and 1, thereby stopping the second registration rollers 37. When the transfer sheet SH is inserted while coming extremely close to the transverse registration sensor, an output from the transverse registration paper sensor S8 tends to be set at logic "1". In this case, the following operation is performed to stop the second registration rollers 37 at an optimal position. As shown in FIG. 20-2, when the second registration rollers 37 are moved, as indicated by arrows ① and ②, the transfer sheet SH is moved away from the sensor S8 to a furthest position. In this case, if an output from the transverse registration paper sensor S8 is set at logic "1", the sheet is moved in a direction indicated by arrow ③. Therefore, the output from the transverse registration paper sensor S8 is not set at logic "0". The second registration rollers 37 are stopped at the above moment, so that an optimal position is set. Assume that a time interval corresponding to one period of transverse movement of the second registration rollers 37 is given as T. If the output from the transverse registration paper sensor S8 is not set at logic "0" even if they are moved by $\frac{3}{4}$T, that is, a time interval corresponding to a distance given by arrows ① and ②, the second registration rollers 37 are stopped.

A case will be described in which the output from the transverse registration paper sensor S8 is set first at logic "0", that is, a transfer sheet is not present in the position of the transverse registration paper sensor S8. In this case, as shown in FIG. 20-3(ii), the second registration rollers 37 are stopped when the output from the transverse registration paper sensor S8 is changed in from 0 to 1. When the transfer sheet SH is inserted while it is, relatively, extremely far away from the the transverse registration paper sensor S8, the output from the transverse registration paper sensor S8 may be kept at logic "0". In this case, if the output from the transverse registration paper sensor S8 does not go to logic "1" even if the second registration rollers are moved by a time interval of T/4 corresponding to arrow ① in FIG. 20-3(ii), the second registration rollers 37 are immediately stopped.

The first copy cycle in the both-side copy mode using the interim tray 40 will be described below. After the copy operation is started, the operations of the paper feed system, the high voltage system, and the optical system are the same as described above. Feeding of the transfer sheet during the ON operation of the first registration rollers 12 will be described with reference to a timing of FIG. 21-1. When the first registration rollers 12 are turned on, the flapper solenoid and an interim tray flapper are turned on. The transfer sheet fed from the first registration rollers 12 passes through the fixing roller in the fixing unit 25 and is transferred toward the interim tray 40. The input sensor S19 of the interim tray 40 detects the number of transfer sheets SH stored in the interim tray 40. After the set number of transfer sheets is detected, the operation of the first registration rollers 12 is stopped.

The first copy cycle in the multicopy mode using the interim tray 40 will be described with reference to a timing chart of FIG. 21-2. The first registration rollers 12 are turned on, and at the same time the flapper 49 of the interim tray 40 is turned on to form a paper path for transferring the transfer sheet SH to the interim tray 40. When the transfer sheet SH is fed out from the first registration rollers 12 and passes through the eject sensor S4, the reverse solenoid is turned on. In the same manner as in the both-side copy mode for single sheets as described above, the transfer sheet SH is switched back (fed backward) and is transferred and stored in the interim tray 40. In this case, the number of sheets stored in the interim tray 40 is counted by the input sensor S19. When the set number of sheets is detected, the operation is ended.

Figure 22:
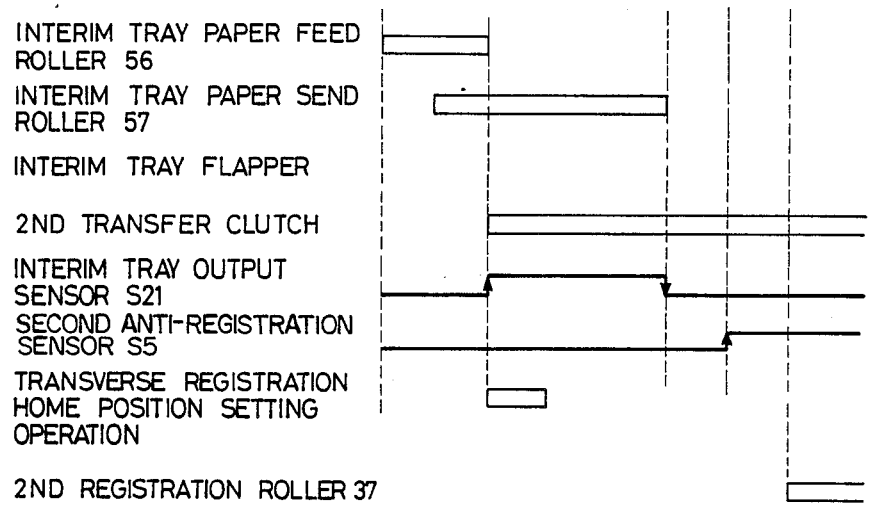

A second copy cycle in the multicopy/both-side copy mode using the interim tray 40 will be described below. The transfer sheets are stocked in the interim tray 40 and a timing for setting the transfer sheets in the second paper feed unit 23 is shown in FIG. 22. More specifically, a solenoid for an interim tray paper feed roller 56 is turned on. The paper feed roller 56 is moved downward by a driving means (not shown), and the uppermost transfer sheet is brought into contact with interim tray paper send rollers 57. Thereafter, a solenoid for the interim tray send rollers 57 is turned on to cause the interim tray paper send rollers 57 to send the transfer sheet to the paper transfer path 59. When the leading end of the transfer sheet reaches the interim tray output sensor S21, the interim tray paper feed roller solenoid is turned off. The paper feed roller 56 is moved upward and is separated from the transfer sheet. In this case, the second transfer clutch is turned on, and the second registration rollers 37 are started so as to set the second registration rollers 37 to the home position.

The transfer sheet reaches the second anti-registration sensor S5. When a predetermined period of time has elapsed, the transfer sheet abuts against the second registration rollers 37 while forming a loop. The second registration rollers 37 are turned on and the transfer sheet is fed toward the first registration rollers 12. The subsequent operations are the same as those in the second copy cycle in the multicopy/both side copy mode for single sheets.

Figure 23:
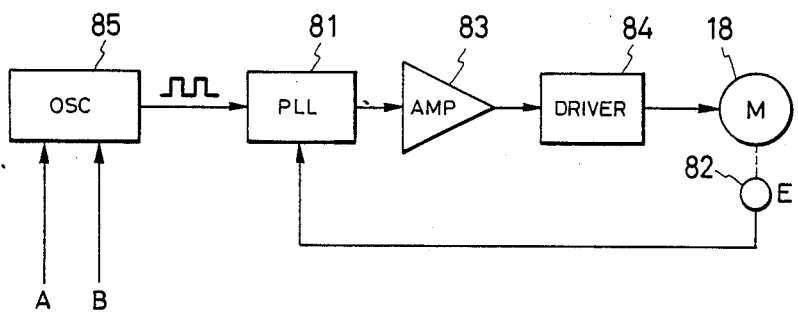
FIG. 23 is a block diagram showing an arrangement of a main motor drive circuit shown in FIG. 2.

A drive operation of the main motor 18 will be described with reference to FIG. 23.

In this embodiment, a DC motor is used as the main motor 18 which functions as a variable speed drive source. Speed control is performed by PLL (Phase-Locked Control). More specifically, a signal from an oscillator 85 is input to a PLL circuit 81 as a reference signal. A speed signal from an encoder 82 connected to the DC motor 18 is fed back to the PLL circuit 81 as a feedback signal. An output from the PLL circuit 81 is transmitted to a driver 84 through an amplifier 83 so as to synchronize the reference signal with the feedback signal. The DC motor 18 is driven by the driver 84. When the speed of the motor 18 is changed, input signals A and B control to change an output frequency of the oscillator 85. The input signals A and B are connected to a speed command circuit (not shown).

Figure 24:
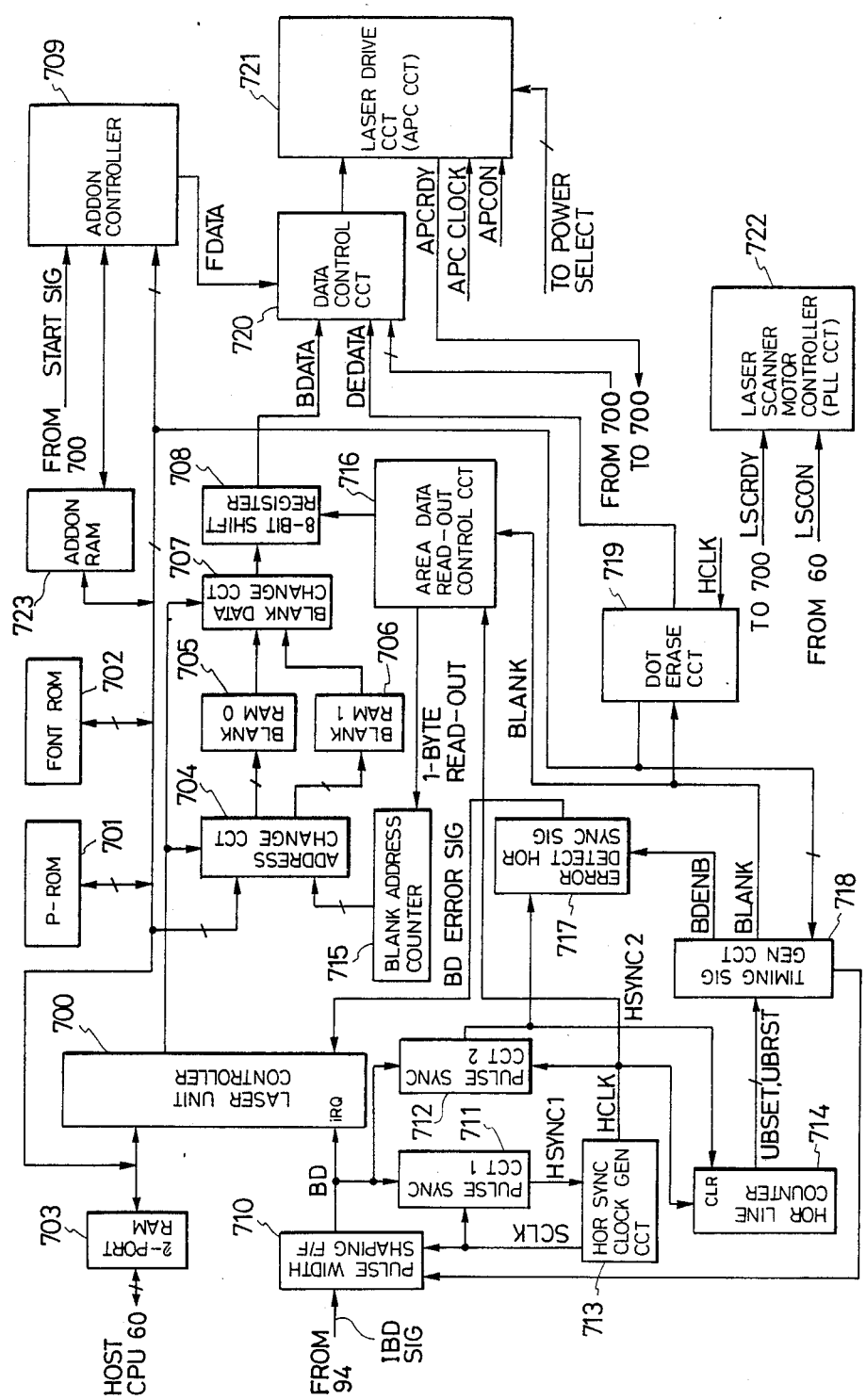
FIG. 24 is a block diagram showing an arrangement of a laser unit shown in FIG. 4.

A circuit arrangement of the laser unit 90 is shown in FIG. 24. Laser unit control information such as a copy mode designated by the mode select key 153, the copy magnification, the paper size, the picture mode, the add-on character code, and the add-on position is supplied to a laser unit controller 700 through a known 2-port RAM 703. The laser unit controller 700 alternately writes, for each line, area data BDATA (to be described later) for area designation in a blank RAM(0) 705 and a blank RAM(1) 706 in accordance with a program of an external program ROM 701. An area data read-out control circuit 716 outputs a control signal to a blank address counter 715 and an 8-bit shift register 708. The area data BDATA is output from the 8-bit shift register 708 to a data control circuit 720 in units of bits.

Each of the blank data RAM(0) 705 and RAM(1) 706 has a capacity for writing one-line area data BDATA and is addressed by the blank address counter 715. While the laser unit controller 700 writes the area data BDATA in the blank RAM(0) 705 or the blank RAM(1) 706, the laser unit controller 700 supplies a control signal to an address change circuit 704 and a blank data change circuit 707 so as to write the data BDATA in the 8-bit shift register 708.

Add-on control for writing characters on the copy image will be described below.

The laser unit controller 700 reads out data (character pattern) from a font ROM (character generator) 702 in accordance with an add-on character code from the controller 60 and sets it in an add-on RAM 723. The add-on RAM 723 comprises a bit map for storing dot patterns of, e.g., 30 characters. The laser unit controller 700 writes add-on character print position designation data representing a print position of a character in the add-on controller 709. When the laser unit controller 700 supplies a start signal to the add-on controller 709, the add-on controller 709 reads out data (character pattern) FDATA from the add-on RAM 723 in accordance with the add-on character print position designation data, and the data FDATA is output to the data control circuit 720.

As shown in FIG. 3, a laser beam emitted from the laser 91 is reflected by the polygonal mirror 93. The reflected beam is transmitted through the focusing lenses 95 and 96. A focused beam spot scans the surface of the photosensitive drum 20. In order to extract a horizontal sync signal, a horizontal sync signal (to be referred to as the BD signal) detect circuit 94 is arranged on the laser scanning surface. The horizontal sync signal (BD signal) output from the BD detect circuit 94 is input to the laser unit 90. This horizontal sync signal (BD signal) is input to a pulse width shaping F/F (flip-flop) 710 shown in FIG. 24 and is waveshaped. The waveshaped signal is input to a pulse sync circuit(1) 711, an interrupt terminal of the laser unit controller 700, and a pulse sync circuit(2) 712. The horizontal sync signal from the BD detect circuit 94, input to the pulse width shaping F/F 710 is called the IBD signal, and the waveshaped horizontal sync output from the pulse width shaping F/F 710 is called the BD signal hereinafter.

The laser unit controller 700 generates an interrupt signal every time the BD signal is generated. The laser unit controller 700 writes the area data BDATA in the blank RAM(0) 705 and the blank RAM(1) 706. The laser unit controller 700 counts the number of interrupt singals in response to the BD signals and then outputs a control signal for the sub-scan direction.

The pulse sync circuit(1) 711 outputs a reset pulse HSYNC1 to a horizontal sync clock generating circuit 713 in synchronism with a leading edge of the BD signal. The horizontal sync clock generating circuit 713 outputs a clock HCLK synchronized with the BD signal. The horizontal sync clock generating circuit 713 comprises a reference clock generator for generating a reference clock SCLK and a frequency divider for frequency-dividing the reference clock SCLK in response to the HSYNC1 and outputting the clock HCLK.

The pulse sync circuit(2) 712 generates a BD signal sync singal HSYNC2 in accordance with the horizontal sync clock HCLK. A horizontal line counter 714 is cleared in response to the signal HSYNC2 and counts the horizontal sync clocks HCLK. An output from the horizontal line counter 714 is input to a timing signal generating circuit 718 so that the horizontal timing signal is output in response to a count output from the horizontal line counter 714.

Figure 25:
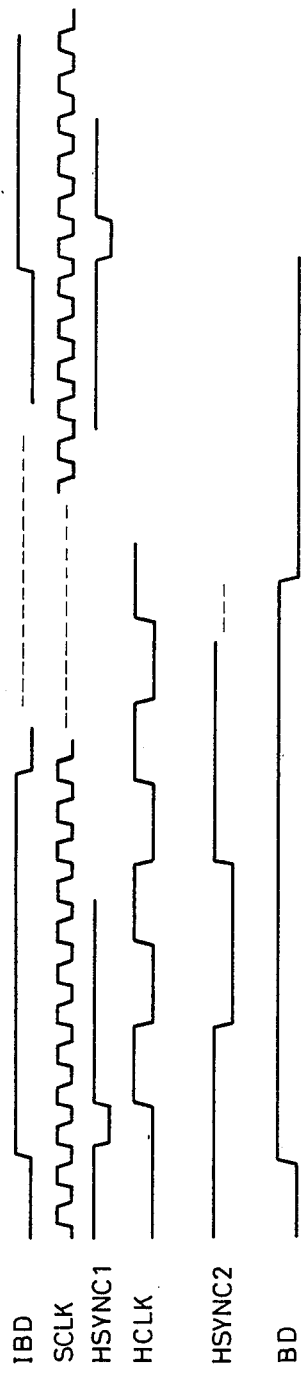
FIGS. 25 and 26 are timing charts of signals in the laser unit shown in FIG. 24.
Figure 26:
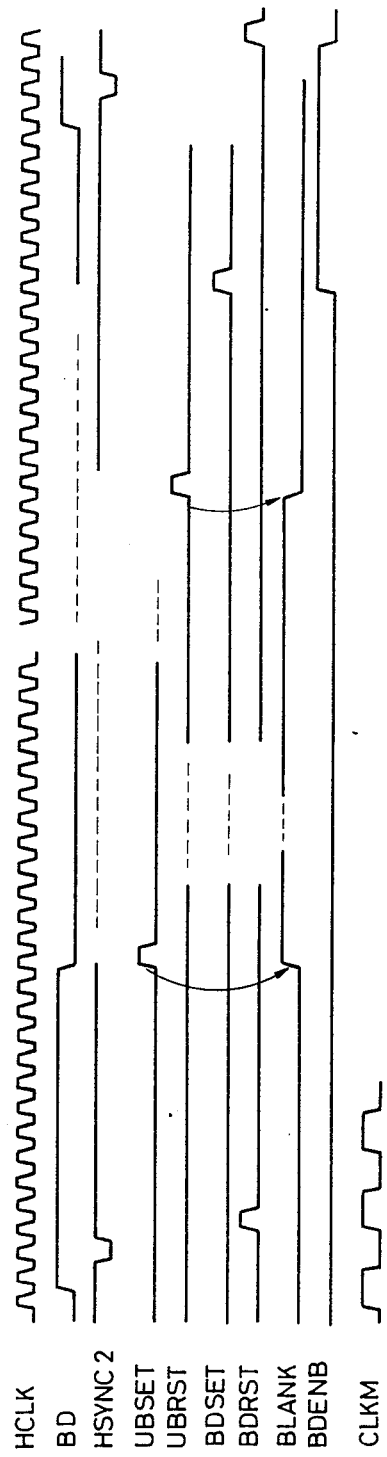

Waveforms of the above-mentioned signals are shown in FIGS. 25 and 26. FIG. 25 shows timings for causing the horizontal clock generating circuit 713 to generate the horizontal sync clocks HCLK in response to the input signal IBD from the BD detect circuit 94. A shown in FIG. 25, The reference clock frequency-dividing counter (frequency divider) in the horizontal sync clock generating circuit 713 is reset in response to the leading edge of the detect pulse (reset pulse) HSYNC1 to generate the horizontal clock HCLK. The pulse sync circuit(2) 712 generates the BD sync signal HSYNC2 in response to the horizontal sync clock HCLK to reset the horizontal line counter 714.

FIG. 26 shows waveforms of signals generated in the laser unit 90. As shown in FIG. 26, the timing signal generating circuit 718 generates signals UBSET and UBRST in accordance with an output from the horizontal line counter 714 to generate a blank signal BLANK for designating an effective image area. A clock for reading out data (dot pattern) from the addon RAM 723 is generated using the horizontal sync clock HCLK. A clock for reading out the designated area data BDATA from the RAM(0) 705 and the RAM(1) 706 is generated using a clock CLKM obtained by frequency-dividing the horizontal sync clock HCLK, thereby obtaining a variable resolution for blank area designation.

The timing signal generating circuit 718 generates the BDSET and BDRST signals and the BDENB signal. These signals are input to the horizontal sync singal error detect circuit 717. When the horizontal sync singal BD is not input within a predetermined time interval, the BDENB signal is not generated. The horizontal sync signal error detect circuit 717 outputs the BD error signal to the laser unit controller 700. When the laser unit controller 700 detects the BD error signal, abnormal status is transferred to the control unit 60 through the 2-port RAM 703.

A dot erase circuit 719 for forming a dot or halftone image will be described with reference to FIGS. 27-1 to 27-3. As shown in FIG. 27-1, the dot erase circuit 719 comprises an 8-bit shift register 724. The horizontal sync clock HCLK is input as a shift clock. Dots are formed on the basis of the timings of the horizontal sync clocks HCLK. As shown in the timing chart of FIG. 27-2, the dot data is loaded by the laser unit controller 700 to the shift register 724 through a data bus DB for a period from a leading edge of the BD signal to the leading edge of the blank signal BLANK representing the effective image area. It should be noted that data loading is performed on the basis of a load signal LOAD from the controller 700. An output from the shift register 724 is logically ANDed with the blank signal BLANK, and the AND signal is output to the data control circuit 720 as a dot signal DEDATA in the form of a dot pattern.

The 8-bit dot data written in the 8-bit shift register 72 is cyclically shifted by the laser unit controller 700 in response to the sync clocks HCLK and is output to an AND gate 725.

FIGS. 27-3A to 27-3C show output dot patterns. The 8-bit dot data stored in the shift register 724 is output as a repeated pattern of D0 to D7 in the main scan direction (laser scan direction). A designated (arbitrary) dot pattern can be generated by the laser unit controller 700 in the sub-scan direction (drum rotational direction) every BD interrupt signal by loading designated (arbitrary) dot data (e.g., DATA0 to DATA7) in the 8-bit shift register 724.

The data control circuit 720 in the laser unit 90 comprises a gate circuit for controlling the character pattern FDATA from the addon controller 709, the area data BDATA, and the dot data DEDATA from the dot erase circuit 719. The data control circuit 720 selectively supplies, e.g., the character pattern FDATA and the dot data DEDATA at a predetermined timing in accordance with a control signal from the laser unit controller 700. The laser drive circuit 721 modulates the laser in accordance with the data input from the data control circuit 720.

Figure 28:
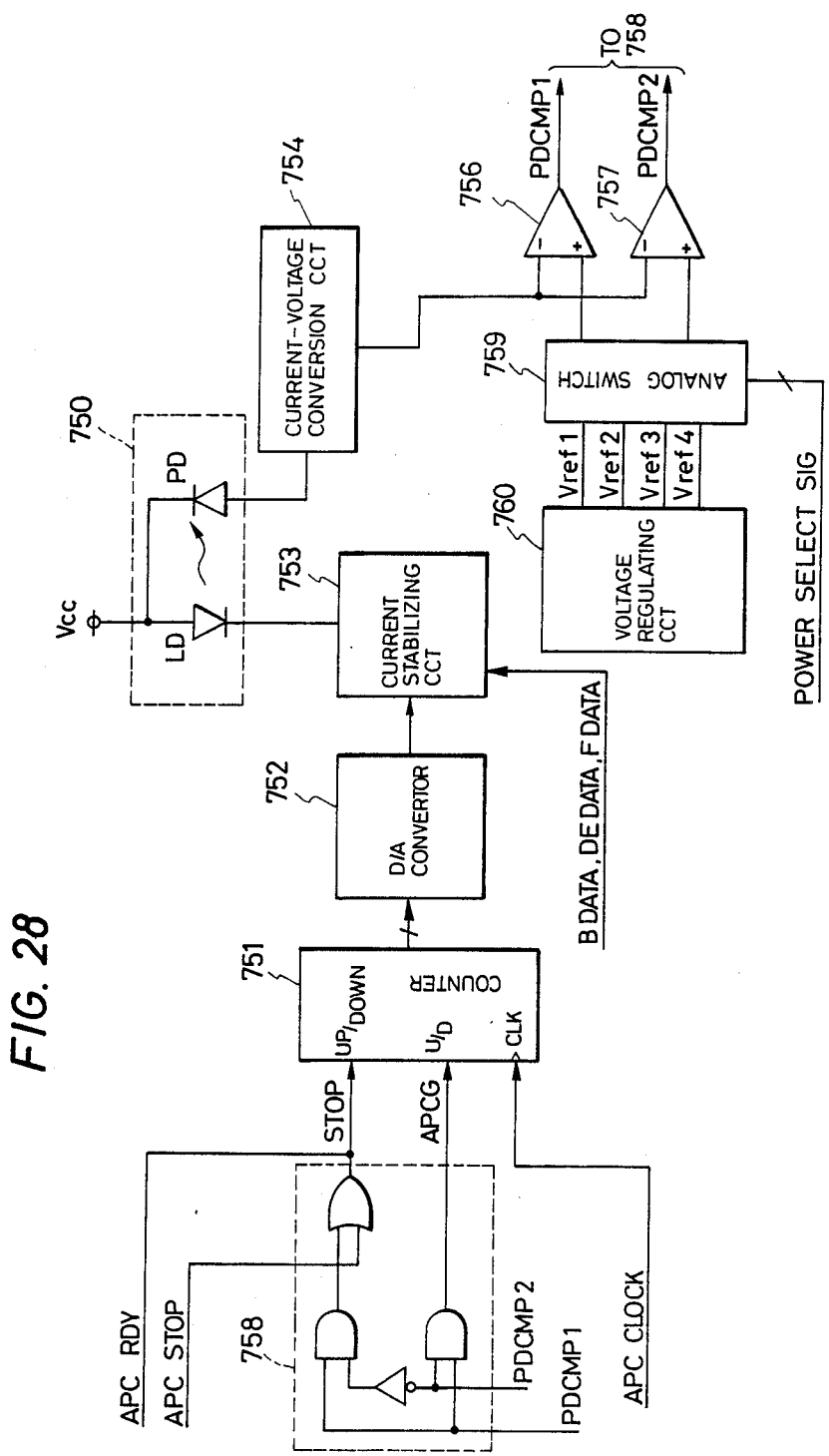
FIG. 28 is a block diagram showing a circuit arrangement of a laser drive circuit shown in FIG. 24.

The laser drive circuit 721 will be described with reference to FIG. 28. A laser 750 is driven by a current stabilizing circuit 753 so that a laser beam having a predetermined power is always output. The laser 750 performs ON/OFF modulation in accordance with the area data BDATA, the dot data DEDATA, and the character pattern or data FDATA. Since the current-emission quantity (power) characteristics of the laser 750 (corresponding to the laser 91 in FIG. 1) vary, known APC (automatic power control) must be performed at a given timing, thereby constantly outputting a laser having a predetermined power. An operation of an APC circuit for performing APC will be described below.

A laser ON signal is output from the laser unit controller 700 to cause the laser 750 to emit a laser beam. A monitor current of a photodiode PD in the laser 750 is input to a current-voltage conversion circuit 754 to extract a voltage proportional to the laser power. One of reference voltages Vref1 to Vref4 output from a voltage regulating circuit 760 is selected by an analog switch 759, and the selected voltage is input to comparators 756 and 757. Therefore, the laser power falls within the predetermined range. More specifically, the comparators 756 and 757 compare the outputs from the current-voltage conversion circuit 754 with the reference voltage and output signals PDCMP1 and PDCMP2 according to comparison results.

Outputs from the comparators 756 and 757 are input to an APC logic circuit. For example, if the laser power falls outside the predetermined range, an up/down counter 751 is controlled (a count value is switched) in accordance with an output APCG from the APC logic circuit 758, thereby changing the data input to a D/A (digital-to-analog) converter 752. The up/down counter 751 performs the count operation in response to the APC clocks when the signal APCG is input thereto. An output from the D/A converter 752 is changed upon a change in count value of the up/down counter 751, and therefore, a current value of the current stabilizing circuit 753 is changed. When the laser power range is controlled to the predetermined range, a stop signal STOP is output from the APC logic circuit 758. The count value of the up/down counter 751 is held as the predetermined data. When the laser unit controller 700 detects the signal STOP, i.e., the APCRDY (ready) signal, the controller 700 outputs the APCSTOP (stop) signal to the laser drive circuit 721 to turn off the laser. An APC end status signal is sent to the control unit 60 through the 2-port RAM 703. An APC method is also disclosed in U.S. Pat. No. 4,443,695.

A laser scanner motor controller 722 (PLL circuit) in FIG. 24 performs speed control of the polygonal mirror 93 at a predetermined speed. For this reason, the controller 722 uses a known PLL circuit (not shown) and initializes rotation of the polygonal mirror 93 in response to the ON signal (LSCON) from the control unit 60. While the polygonal mirror 93 is rotated at the predetermined speed, the laser scanner motor controller 722 uses the known PLL (Phase Locked Loop) clock to output the laser scanner ready signal (LSCRDY) to the laser unit controller 700.

The laser unit controller 700 monitors the laser scanner motor ready signal at predetermined intervals. When a predetermined period of time has elapsed upon ON operation of the laser scanner motor 92 and the laser scanner motor ready signal is not output, the laser unit controller 700 sends a laser scanner motor abnormal signal to the control unit 60.

Figure 29B:
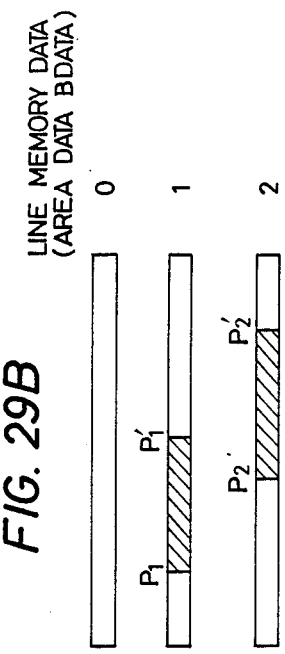
FIGS. 29A to 29C are views for explaining an area designation operation in the laser unit shown in FIG. 24.

An operation for controlling a designated image area by using the blank RAM(0) 705 and the blank RAM(1) 706 will be described with reference to FIGS. 29A to 29C.

Figure 29C:
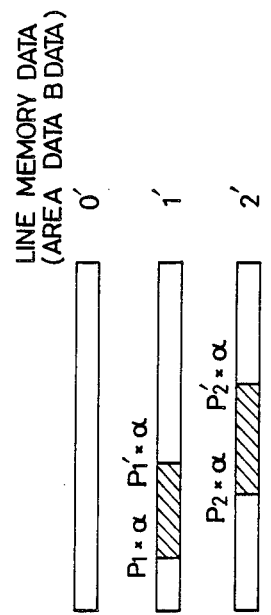
Figure 29A:
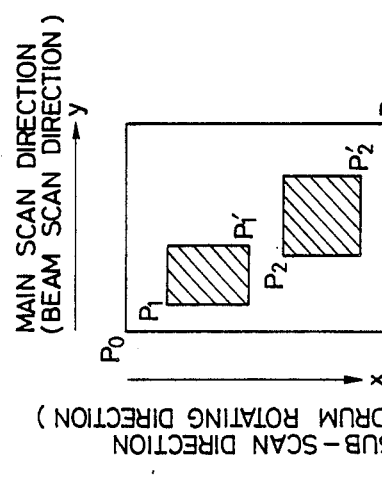

When data (P1,P1') and (P2,P2') which designates areas shown in FIG. 29A are sent from the control unit 60 to the laser unit controller 700 through the 2-port RAM 703. Assume that each of the blank RAM(0) 705 and the blank RAM(1) 706 in the laser unit 90 has a one-line memory capacity at a predetermined area resolution. When the areas are designated, as shown in FIG. 29A, three line memory data (area data BDATA) are prepared. Line memory data 0 is read out from the RAM(0) 705 from a start point P0 to an x-coordinate x1 of the point P1. Line memory data 1 is read out from the blank RAM(1) 706 from the x-coordinate x1 of the point P1 to an x-coordinate x1' of the point P1'. The line memory data 0 is read out from the blank RAM(0) 705 from the x-coordinate x1' of the point P1' to an x-coordinate x2 of the point P2. Line memory data 2 is read out from the blank RAM(1) 706 from the x-coordinate x2 of the point P2 to an x-coordinate x2' of the point P2'. The line memory data 0 is read-out from the blank RAM(0) 705 from the x-coordinate x2' of the point P2' to an end point PE. As a result, the area excluding the areas (P1,P1') and (P2,P2') shown in FIG. 29A is irradiated with the laser beam, so that a copy image of the original is restricted to the areas (P1,P1') and (P2,P2').

Under the control of the laser unit controller 700, the line memory data is written in one of the blank RAMs which is not set in the read operation. In the reduction-/enlargement mode, the following calculations using the data of the points P1, P1', P2, and P2' sent from the control unit 60 are performed in accordance with a magnification $\alpha$:

$$P1 \times \alpha, P2 \times \alpha, P1' \times \alpha, \text{ and } P2' \times \alpha$$

The line memory data 0, 1, and 2 are updated as shown in FIG. 29C.

Figure 30:
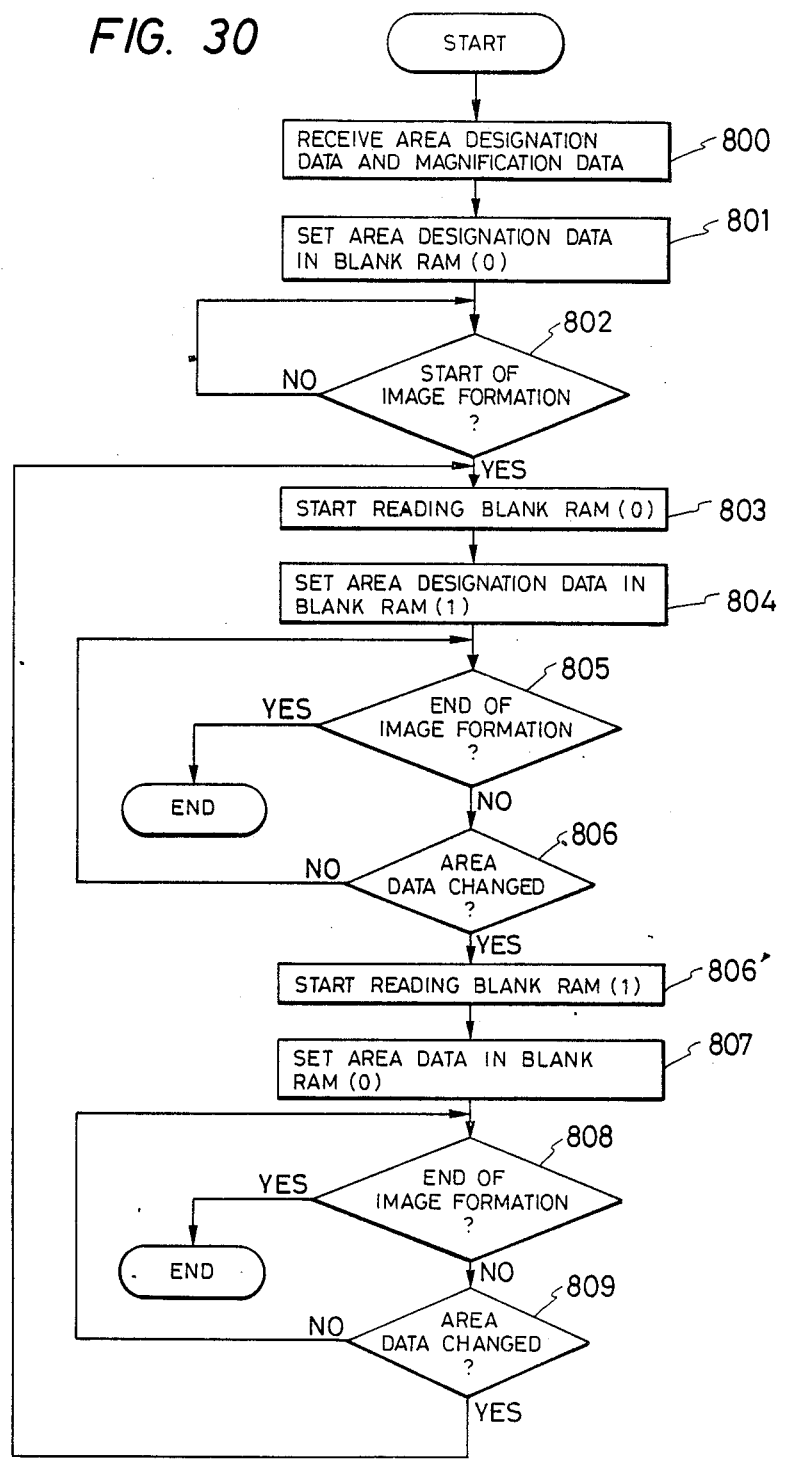
FIG. 30 is a flow chart showing an area designation operation in a laser unit controller shown in FIG. 24.

The control sequence of the laser unit controller 700 in area designation control will be described with reference to a flow chart in FIG. 30. Area designation data and magnification data are received from the control unit 60 in step 800. The line memory data (area data BDATA) is set in the blank RAM(0) 705 by using the area designation data and the magnification data in step 801. In step 802, the laser unit controller 700 waits for an image formation start command from the control unit 60 in step 802. When the image formation start command is supplied from the control unit 60 in step 802, the laser unit controller 700 starts reading out the data from the blank RAM(0) 705.

The next line memory data (area data BDATA) is set in the blank RAM(1) 706 in step 804. In decision steps 805 and 806, the laser unit controller 700 determines whether the end of image formation and the area designation data change occur. This decision operation is performed such that the BD signals are counted from the start of image formation in the laser unit controller 700 and the count is compared with the sub-scan position data of the points P1, P1', P2, P2', and PE.

If the area designation data change is determined, the read/write access of the RAMs is reversed in steps 806 and 807. The laser unit controller 700 waits for the timing in steps 808 and 809 in the same manner as in steps 805 and 806. If the affirmative determination is established in step 809, the flow returns to step 803, and the above operations are repeated until the end of image formation.

The laser unit 90 will be described in more detail with reference to FIG. 24. As described above, the laser unit controller 700 comprises a CPU for performing operations in accordance with programs stored in a program ROM 701. The laser unit controller 700 performs controls the respective circuits in accordance with the control information input from the control unit 60 and performs (1) area designation operation, (2) dot formation operation, and (3) add-on (character input) operation.

The above three operations are performed in accordance with a command from the console unit 100 or the editor 180.

Referring to FIG. 24, the pulse width shaping F/F 710, the pulse sync circuit(1) 711, the pulse sync circuit(2) 712, the horizontal sync clock generation circuit 713, the horizontal line counter 714, and the timing signal generation circuit are arranged to generate timing signals serving as the reference clocks for the above three operations. As previously described, the sync signal BD generated by the horizontal sync signal detect circuit 94 is waveshaped by the pulse width shaping F/F 710 and is converted into the horizontal sync signal BD synchronized with the reference clock SCLK output from the horizontal sync clock generation circuit 713. The reset pulse HSYNC1 synchronized with the leading edge of the horizontal sync singal BD is output from the pulse sync circuit(1) 711. The horizontal sync clock HCLK obtained by frequency-dividing the reference clock SCLK in synchronism with the reset pulse HSYNC1 is output from the horizontal sync clock generation circuit 713. The dot formation operation and the addon (character input) operation are controlled in synchronism with the horizontal sync clock HCLK. The area designation operation is controlled in synchronism with the clock CLKM obtained by frequency-dividing the horizontal sync clock HCLK.

In this embodiment, since the horizontal sync clocks HCLK and CLKM synchronized with the sync signal IBD by using a high-frequency reference clock SCLK are generated, positional precision along the main scan direction (laser beam scan direction) can be improved.

The pulse sync circuit(2) 712 generates the BD signal sync signal HSYNC2 synchronized with the horizontal sync clock HCLK on the basis of the horizontal sync signal BD. Various counters (not shown) in the horizontal line counter 714 are reset in response to the signal HSYNC2, and the horizontal sync clocks HCLK are counted from zero. In the horizontal line counter 714, values of the various counters are compared with values (signal lines and the like are not illustrated) set from the laser unit controller 700. When a coincidence is established in each counter, the horizontal line counter 714 generates the UBSET and UBRST signals.

In response to the UBSET and UBRST signals input from the horizontal line counter 714, the timing signal generating circuit 718 generates the blank signal BLANK for designating an effective image area. When the blank signal BLANK is set at logic "1", the area designation operation, the dot formation operation, and the addon operation are performed. In other words, the blank signal BLANK is a signal representing an area in which image formation can be actually performed on a transfer sheet. The laser unit controller 700 changes the set values in the horizontal line counter 714 in accordance with the transfer paper size, the magnification, and the like and changes a generation timing of the blank signal.

The area designation operation will be described below. Referring to FIG. 24, the area designation operation is primarily performed using the laser unit controller 700, the address change circuit 704, the blank RAM(0) 705, the blank RAM(1) 706, the blank data change circuit 707, the 8-bit shift register 708, the blank address counter 715, and the area data read-out control circuit 716. As previously described, the area data BDATA representing the designated areas are written in the blank RAM(0) 705 and the blank RAM(1) 706.

The blank data change circuit 707 selects an output from either the blank RAM(0) 705 or the blank RAM(1) 706 and writes the selected data in the 8-bit shift register 708. The 8-bit shift register 708 performs parallel/serial conversion of the area data BDATA in accordance with a control signal from the area data read-out control circuit 716 and sequentially outputs the serial data. An address of the blank RAM in the read operation of the area data is accessed by the blank address counter 715 and is input through the address change circuit 704. The blank RAM in the non-read access of the area data is connected to an address line (not shown) of the laser unit controller 700 through the address change circuit 704, thereby allowing desired area data access.

The operations of the data control circuit 720 for the area designation operation, the dot formation operation, and the addon operation will be described below. It should be noted that the data control circuit 720 comprises known gate circuits and the like.

(i) Only Area Designation Operation

Only the area data BDATA is input to the laser drive circuit 721 in accordance with a control signal from the laser unit controller 700.

(ii) Dot Formation Operation

An OR signal of the area data BDATA and the dot signal DEDATA is input to the laser drive circuit 721 in accordance with a control signal from the laser unit controller 700. For example, if dots are formed within only the designated area (i.e., "within" area), the data BDATA for only the designated area are set at logic "0" and those in other areas are set at logic "1" in the same manner as in the area designation operation. As a result, the dot signal DEDATA for only the portion corresponding to the designated area is input to the laser drive circuit 721, and a dot image is formed within only the designated area. A drive signal of logic "1" for the area ("without" area) other than the designated area is input to the laser drive circuit 721, and the erase operation with laser radiation is performed.

(iii) Simultaneous Copy Mode of Digital Image (Character) and Analog Image

An AND signal of the area data BDATA and the character pattern FDATA is input to the laser drive circuit 721 in accordance with a control signal from the laser unit controller 700. For example, the following operations are performed to obtain an image shown in FIG. 11C. The area data BDATA are set in the area designation operation such that all "0"s are set in all areas excluding the area indicated by the hatched lines in FIG. 11C, and that "1"s are set in the area indicated by the hatched lines. The data BDATA "0" for the areas excluding the hatched area shown in FIG. 11C is input to the laser drive circuit 721, and an original image is copied without changes. Since the data BDATA is set at logic "1" for portions other than the character portion within the hatched area, and the erase operation with laser radiation is performed. The character portion within the hatched area is formed by the character pattern FDATA input to the laser drive circuit 721.

(iv) Multicopy Mode of Digital Image

The same operations as in mode (iii) ar performed except that the designated areas are different. In order to obtain the image shown in FIG. 11D, in the first copy cycle, the area designation data BDATA for all image areas are set at logic "1". During the first copying cycle, only characters corresponding to the character pattern FDATA are formed. The area excluding the character portion is irradiated with the laser beam, and the erase operation is performed. In the subsequent or second copy cycle, the area designation data BDATA for all image areas are set at logic "0", and only the data BDATA is input to the laser drive circuit 721. As a result, the area is not irradiated with the laser beam, and only the analog image corresponding to the original image is formed on the transfer sheet in addition to the characters formed in the first copy cycle.

Figure 36:
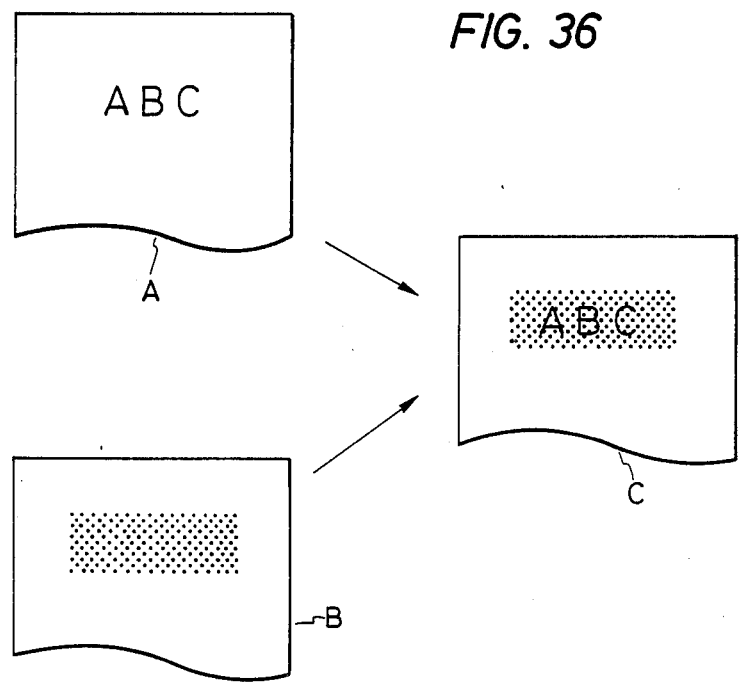
FIG. 36 is a view showing an image merge recording between an original image and a dot image in the apparatus of this embodiment.

FIG. 36 shows a recording operation of this embodiment. An area B surrounded by dotted lines on an original A is designated by the editor 180.

The operator uses the mode select key 153 in the editor 180 to select on of the modes 7 and 8 represented by reference numeral 162. However, if the mode 8 is selected, the user can further selects a development color with the development unit selection key 104. Therefore, the preliminary operations prior to actual copying are completed.

When the operator depresses the copy key 103 on the console unit 100 shown in FIG. 5, an image on the original is exposed with light and scanned to form an image. A transfer sheet having a transferred image is transferred to the second registration rollers 37. As previously described, the dot image is formed for only the designated area, as shown in FIG. 36B, and a multicopy image is formed on the transfer sheet. As a result, a composite image shown in FIG. 36C is obtained.

In the above description, when the operator selects dot recording in the multicopy mode, the original development is performed in the first copy cycle. In the second copy cycle, dot development is performed. However, a dot image may be developed and recorded in the first copy cycle, and the original image may be developed and copied in the second copy cycle. The dot image recording area may be designated in each copy cycle, and a plurality of portions may be designated for dot image formation.

According to this embodiment as described above, since the dot image can be superposed on the original image information in a designated area of the original image, the original image information can be easily emphasized without impairing the original image information of the designated area.

Figure 31:
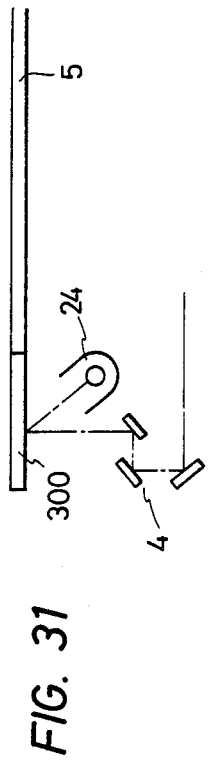
FIG. 31 is a front view showing the main part of this embodiment.

FIG. 31 shows the main part of this embodiment. The optical system 4 as a main record optical system is located at the home position. A white plate 300 is disposed at the home position, in the end portion of the original glass table 5. When the exposure lamp 24 is turned on while the optical system 4 is stopped at the home position, light emitted from the exposure lamp 24 is reflected by the white plate 300 and guided to a reflecting mirror in the optical system 4. The reflected light is emitted on the photosensitive drum 20. The photosensitive drum 20 is rotated at a predetermined speed and the surface of the white plate 300 is coated with a white layer. In other words, the surface of the photosensitive drum 20 has a high reflectivity, a "white" portion on the photosensitive drum 20 is developed, and an unnecessary latent image portion is erased.

Figure 32:
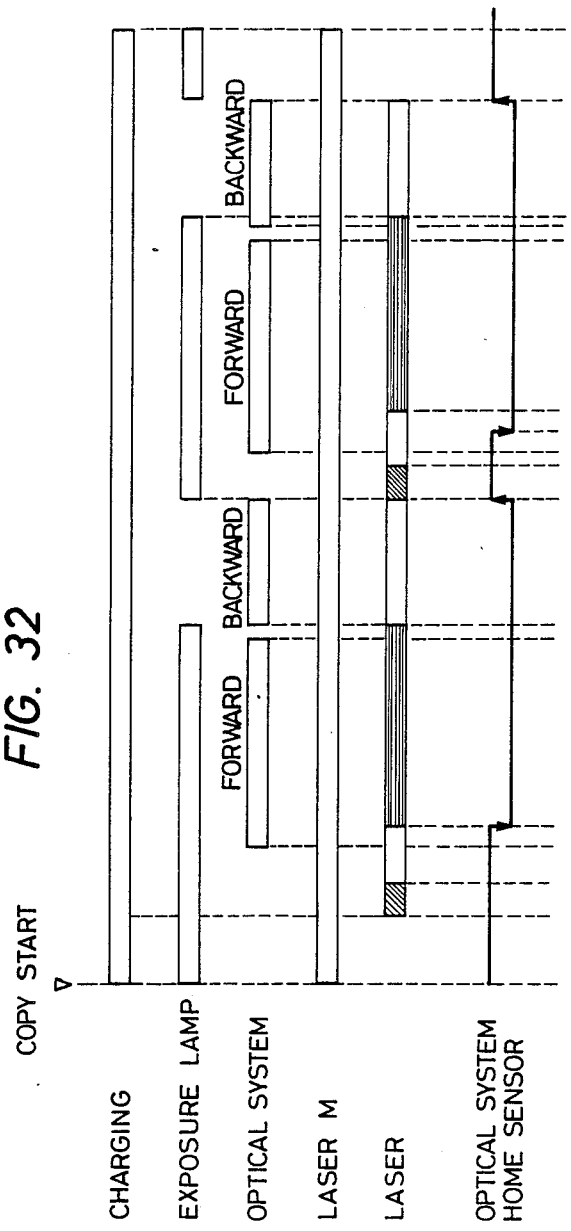
FIG. 32 is a timing chart showing a record timing during copying of a plurality of sheets.
Figure 33A:
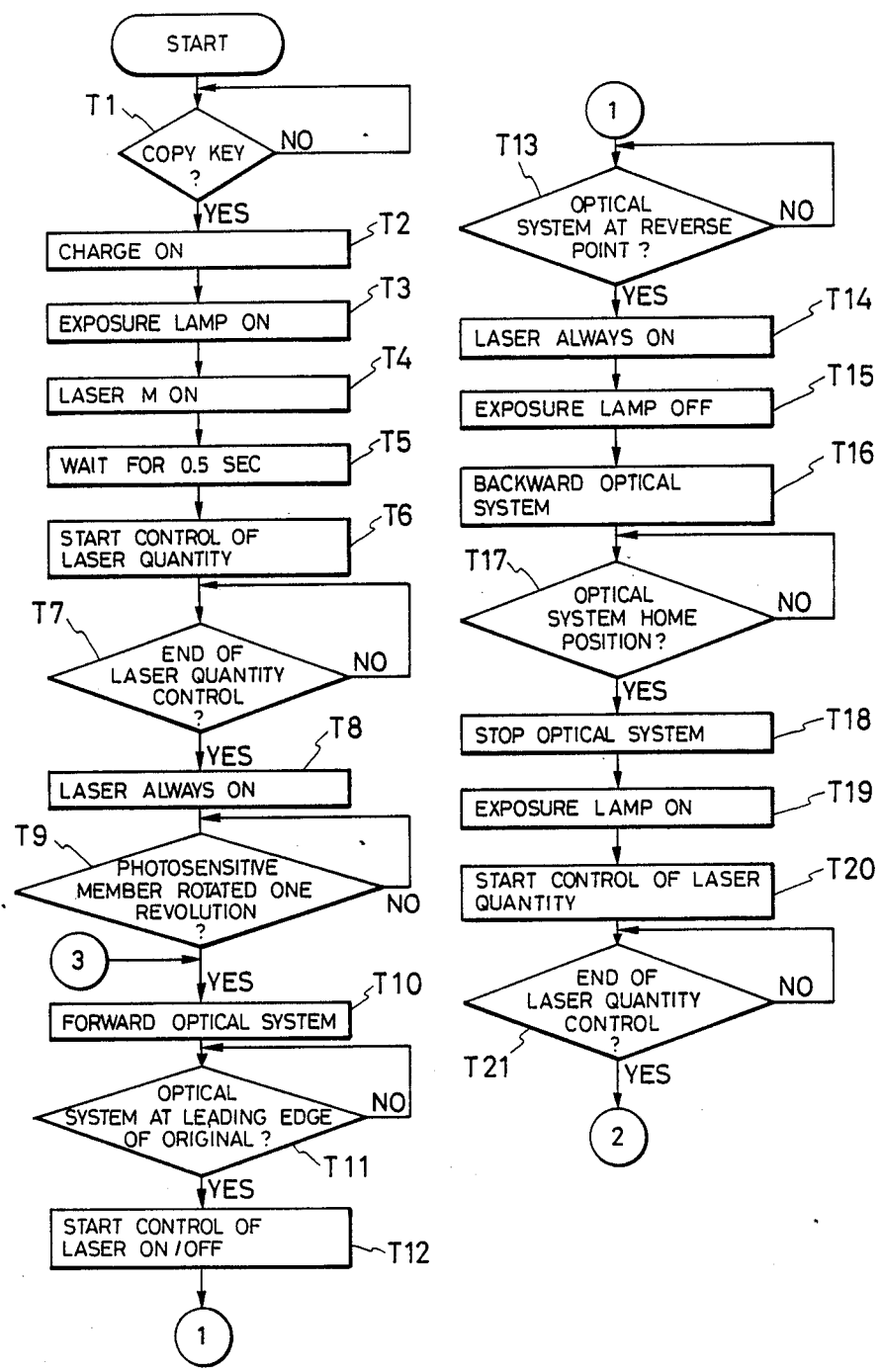
FIGS. 33A and 33B are flow charts showing a control sequence in an operation for copying a plurality of sheets.
Figure 33B:
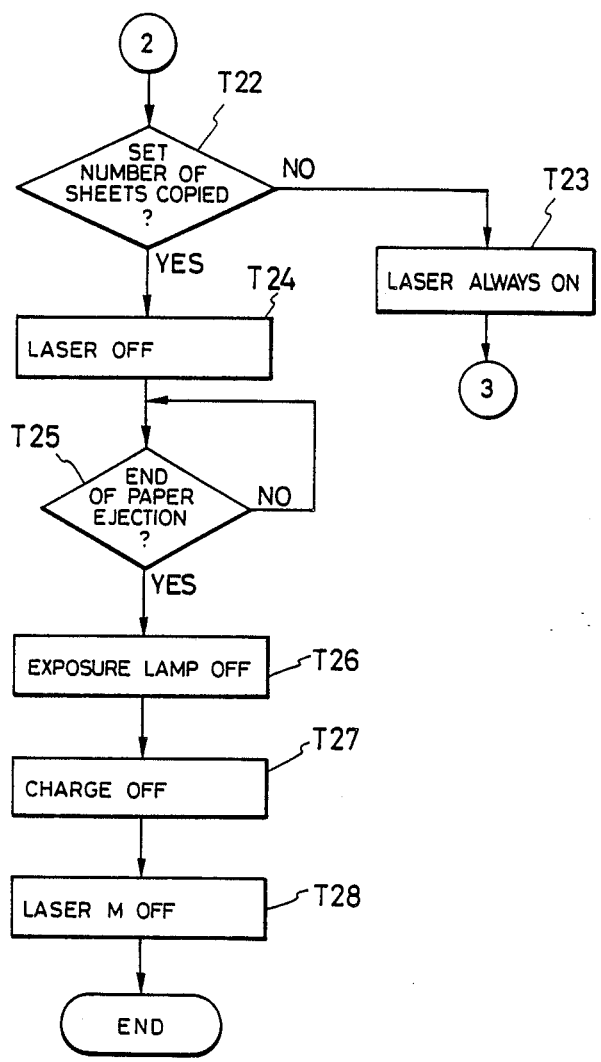

A recording timing of a copy operation for a plurality of sheets in this embodiment is shown in FIG. 32, and its control sequences are shown in FIGS. 33A and 33B. An operation for starting recording in this embodiment will be described with reference to the flow charts in FIGS. 33A and 33B.

When the copy key 103 for designating the start of copying is depressed, the copy start operation is started (step T1), and the photosensitive drum 20, the chargers 13, 15, and 16, the exposure lamp 24, and a laser motor 92 are turned on (steps T2 to T4). At the start of copying, the optical system 4 is stopped at the home position, as shown in FIG. 31. In this state, the erase operation for developing a "white" portion on the photosensitive drum 20 is performed. A timer is operated to detect until the laser motor 92 for rotating the polygonal mirror 93 is rotated at a constant speed (step T5), and laser quantity control of the laser 91 is started (step T6). Laser quantity control of the laser 91 is performed to set a laser output (beam output) to be constant. Laser quantity control is indicated by hatched portions in representation of the laser output in FIG. 32.

When laser quantity control is completed (step T7), the laser 91 is turned on and kept on (step T8). The ON state is indicated by hollow rectangles in the representation of the laser output in FIG. 32. A residual image (history) on the photosensitive drum 20 is erased and the surface state is uniformed (step T9), the original scan optical system 4 is forwarded (step T10), and original exposure started. Thereafter, when the optical system 4 reaches a position where it can detect the leading end of the original, the leading edge sensor S2 detects the leading edge (step T11). ON/OFF control of the laser 91 is started (step T12), and the specific image portion (latent image) on the photosensitive drum 20 is erased (image erase operation) or predetermined image information such as date or page numbers designated by the user is output on the photosensitive drum 20. This state is indicated by portions indicated by horizontal lines and included in the representation of the laser output in FIG. 32.

The original is exposed with light and scanned by a length corresponding to the length of the transfer sheet SH, and the image is transferred to the transfer sheet. The optical system 4 reaches the reverse point (step T13), the laser 91 is turned on and kept on (step T14). The exposure lamp 24 is turned off (step T15), and the optical system 4 is fed backward (step T16). Therefore, the surface of the photosensitive drum 20 is clearly erased with the laser beam.

When the optical system 4 returns to the home position (step T17), movement of the optical system 4 is stopped (step T18), and the exposure lamp 24 is turned on (step T19). Laser quantity control for setting the laser quality to be constant is started again (step T20). During this period, the residual image on the photosensitive drum 20 is erased by the exposure lamp 24.

When laser quality control is completed (step T21) and the end of the set number of copies is not detected in step T22, the laser 91 is turned on and kept on (step T23), and the flow returns to step T10. The optical system 4 is forwarded. The same recording and copying operations as in the first copy cycle are repeated. Thereafter, the optical system 4 is fed backward and returns to the home position (steps T17 and T18). The exposure lamp 24 is turned on (step T19) and the erase operation is performed using the exposure lamp 24 and the white plate 300. The above operations are repeated, the end of the set number of copies is detected (step T22). The laser 91 is turned off (step T24), and the transfer sheet is ejected from the copying machine (step T25). The exposure lamp 24, the chargers 13, 15, and 16 and the laser motor 92 are turned off (steps T26 to T28). Therefore, all the operations are completed.

Figure 34:
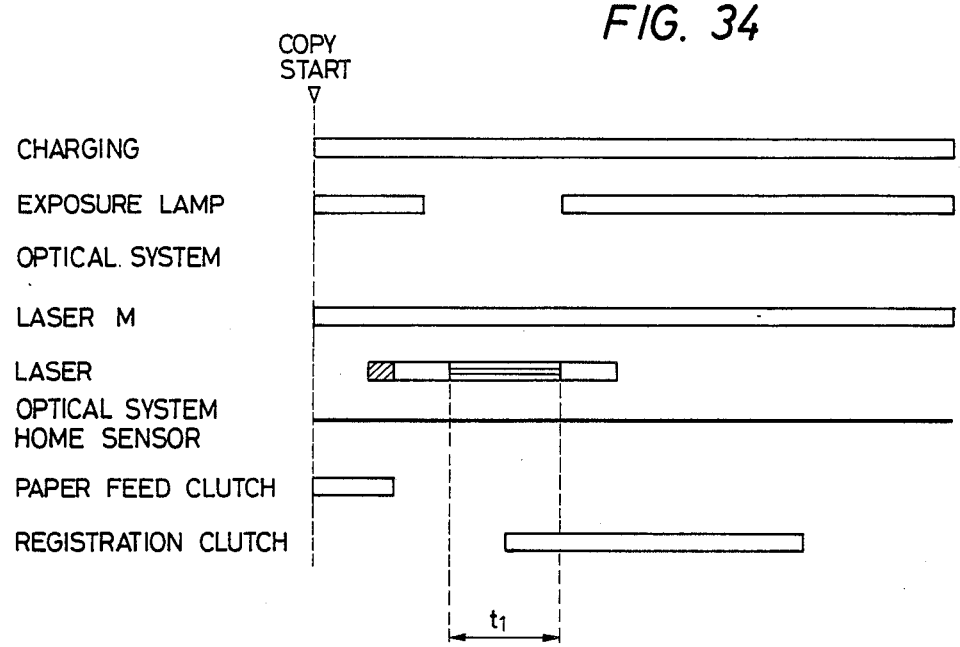
FIG. 34 is a timing chart showing an operation for writing desired image information with a laser without performing original exposure in this embodiment.
Figure 35:
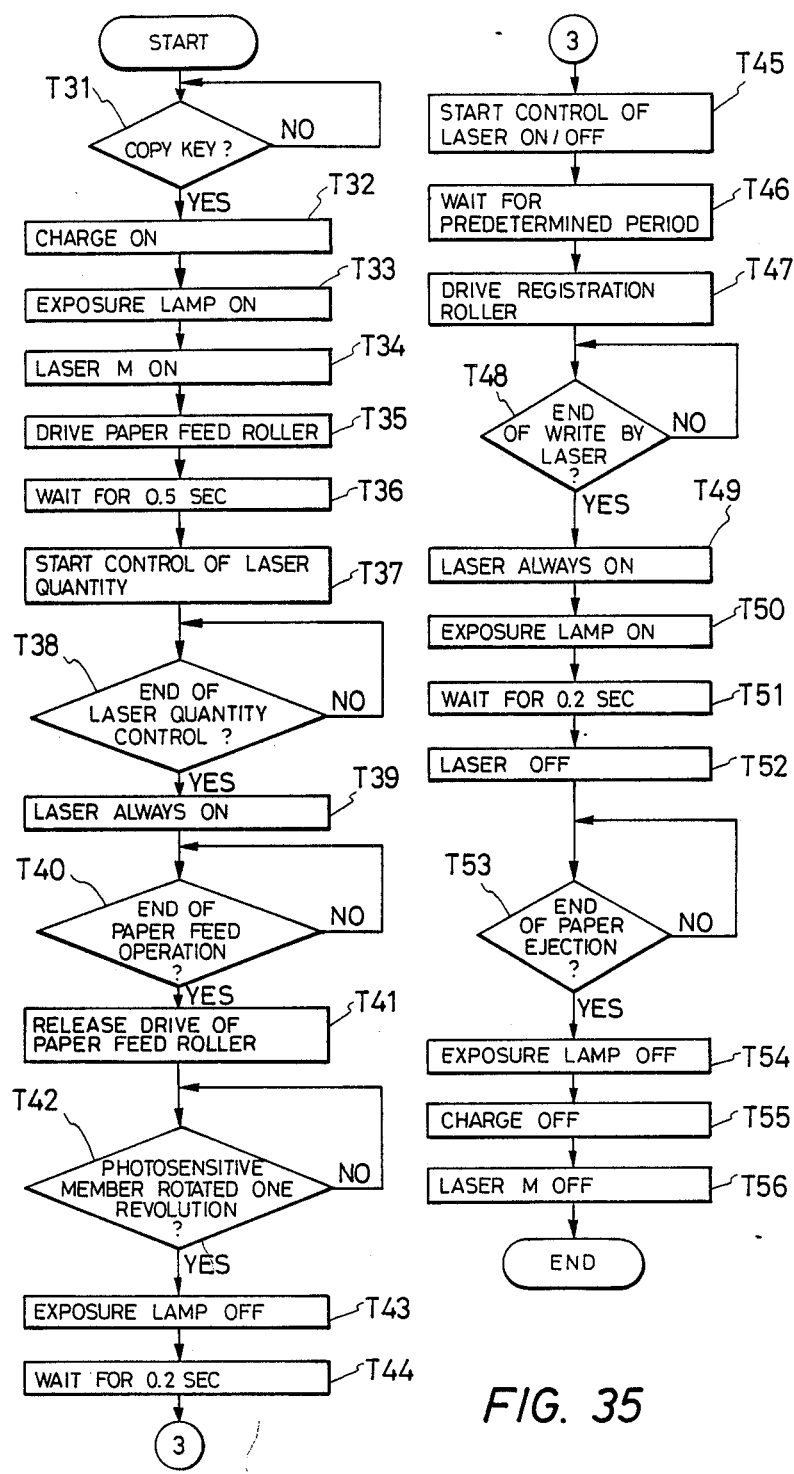
FIG. 35 is a flow chart showing an operation sequence for writing desired image information with a laser without performing original exposure in this embodiment.

In the embodiment shown in FIG. 31, an operation for writing predetermined image information with the laser 91 without performing original exposure will be described with reference to the timing chart in FIG. 34 and the flow chart in FIG. 35. When the copy key 103 is depressed (step T31), the chargers 13, 15, and 16, the exposure lamp 24, and the laser motor 92 are turned on, and at the same time the clutch for the paper feed roller 10 or 11 is turned on (steps T32 to T35). Since the optical system 4 is stopped at the home position, as shown in FIG. 31, the photosensitive drum 20 is erased by the exposure lamp 24.

When the speed of the laser motor 92 reaches a constant speed (step T36), laser quantity control of the laser 91 is started (step T37). This control time is represented by a hatched portion in the laser output in FIG. 34.

When the quantity of the laser 91 reaches a predetermined value (step T38), the laser 91 is kept on (step T39). This ON period is represented by hollow rectangles in the laser output in FIG. 34. Thereafter, when the leading edge of the transfer sheet SH abuts against the first registration rollers 12 and a loop (curve) having a predetermined amount is formed, the clutch for the paper feed roller 10 or 11 is turned off (steps T40 and T41). The surface of the photosensitive drum 20 is made uniform, or evened, by the ON operation of the exposure lamp 24 and the erase operation of the laser 91 (step T42), the exposure lamp 24 is turned off (step T43). The erase operation is started by only the beam from the laser 91. When the exposure lamp 24 is completely turned off (step T44), the write operation of characters and the like is started by the ON/OFF control of the laser 91 (step T45). This write period is indicated by a portion represented by horizontal lines included in the laser output in FIG. 34.

The copying machine waits for a predetermined period (step T46), and the clutch for the registration rollers 12 is turned on (step T47). The transfer sheet SH is fed to the photosensitive drum 20 in synchronism with the image. Since the write operation by the laser 91 is performed for part of the transfer sheet, this operation can be completed within a very short period t1 (step T48).

The laser 91 is turned on (step T49) and the exposure lamp 24 is turned on (step T50). The surface of the photosensitive drum 20 is erased by the exposure lamp 24. In this case, the laser 91 is kept on with a maximum power within the period corresponding to the leading time of the exposure lamp 24 (steps T51 and T52). After the clutch of the registration rollers 12 is turned on by a period corresponding to the length of the transfer sheet, this clutch is turned off. Thereafter, when the transfer sheet is ejected out from the copying machine or set in the interim tray 40 (step T53), the exposure lamp 24, the chargers 13, 15, and 16, and the laser motor 92 are turned off (steps T54 to T56). All the operations are thus completed.

Since the erase operation at the start of recording is performed by the erasing means constituted by the exposure lamp 24 and the white plate 300, the copying machine can start charge sequence control without waiting until the rise time of the laser motor 92, thereby greatly increasing the recording speed. In addition, since the laser is kept off during the erase operation by the erasing means, the ON time of the laser can be reduced. Therefore, the copying machine can be used for a long period of time, machine reliability can be improved, and maintenance/service cost can be reduced.

The present invention is not limited to the particular embodiment described above. Various changes and modifications may be made within the scope of the appended claims.

What is claimed is:

1. An image recording apparatus comprising:
   first recording means for scanning an original image and recording an image on a recording medium, wherein said first recording means has a first operation mode for evening a surface of the recording medium;
   second recording means for recording an image on the recording medium; and
   control means for controlling said first and second recording means, wherein said control means controls said first recording means so as to even the surface of the recording medium in the first operation mode during preparation for recording by said second recording means.

2. An apparatus according to claim 1, wherein said second recording means has a second operation mode for evening the surface of the recording medium, and wherein said control means controls said second recording means so as to even the surface of the recording medium in the second operation mode prior to original scanning by said first recording means.

3. An apparatus according to claim 1, wherein said second recording means comprises beam generating means for generating a beam and means for scanning the recording medium with the beam.

4. An apparatus according to claim 3, wherein said beam generating means modulates the beam on the basis of an input image signal.

5. An apparatus according to claim 3, wherein the preparation operation for recording by said second recording means includes an operation for controlling a beam scan speed of said scanning means to be constant.

6. An apparatus according to claim 5, further comprising beam quantity control means for controlling a quantity of the beam generated by said beam generating means, wherein the preparation for recording by said second recording means includes an operation by said beam quantity control means for controlling the beam quantity to be constant.

7. An apparatus according to claim 1, wherein said first recording means comprises exposing means for exposing and scanning the original image and a white plane exposed with said exposing means, said white plate being exposed by said exposing means in the first operation mode.

8. An image recording apparatus, comprising:
   first recording means for scanning an original image and recording an image on a recording medium, wherein said first recording means has a first operation mode for evening a surface of the recording medium;
   second recording means for recording an image on the recording medium with a beam;
   adjusting means for adjusting a quantity of the beam used by said second recording means; and
   control means for controlling said first and second recording means and said adjusting means, wherein said control means evens a surface of the recording medium by using said first recording means during the adjustment of the beam quantity by said adjusting means.

9. An apparatus according to claim 8, wherein said second recording means comprises means for scanning the recording medium with the beam, and wherein said control means controls the quantity of the beam by using said adjusting means after a beam scan speed of said scanning means is controlled to be constant.

10. An apparatus according to claim 9, wherein said second recording means has a second operation mode for evening the surface of the recording medium with the beam, and wherein said control means evens the surface of the recording medium in said second operation mode after the beam quantity is controlled to be constant.

11. An apparatus according to claim 8, wherein said first recording means comprises exposing means for exposing and scanning the original image and a white plate exposed with said exposing means, said white plate being exposed by said exposing means in the first operation mode.

12. An image recording apparatus comprising:
a main record optical system capable or irradiating a charged area on a photosensitive body with illumination light from an original exposure lamp and erasing an image;
a sub-record optical system capable of selectively irradiating the charged area and erasing an image at a designated area; and
control means for controlling said main and said sub-record optical systems,
wherein said control means controls said main record optical system during a preparation operation of said sub-record optical system so as to erase an image on the photosensitive body.

13. An apparatus according to claim 12, wherein said sub-record optical system comprises beam generating means for generating a beam and means for scanning the photosensitive body with the beam, wherein said apparatus further comprises beam quantity control means for controlling a beam quantity of the beam generated by said beam generating means, and wherein the preparation operation of said sub-record optical system includes an operation for controlling a beam scan speed of said scanning means to be constant and an operation by said beam quantity control means for controlling a beam quantity to be constant.

14. An image recording apparatus comprising:
an original scanning main record optical system capable of irradiating a charged area on a photosensitive body with illumination light from an original exposure lamp and erasing an image;
a sub-record optical system capable of selectively irradiating the charged area and erasing an image at a designated area; and
control means for causing said main record optical system at the start of recording to erase the image and thereafter said sub-record optical system to erase the image,
wherein said main record optical system comprises an original scan system and a white plate disposed at a predetermined position, and said control means causes said original scan system to stop at the predetermined position and causes the illumination light from said original exposure lamp to be emitted onto said white plate so as to erase the image.

15. An image recording apparatus comprising:
a main record optical system capable of irradiating a charged area on a photosensitive body with illumination light from an original exposure lamp and erasing an image;
a sub-record optical system capable of selectively irradiating the charged area and erasing an image at a designated area;
light quantity adjusting means for adjusting a light quantity output by said sub-record optical system to irradiate the charged area, to a predetermined value; and
control means for controlling said main and said sub-record optical systems and said adjusting means,
wherein said control means controls said main record optical system during a light quantity adjustment operation by said adjusting means to erase an image on the photosensitive body.

16. An apparatus according to claim 15, wherein said sub-record optical system comprises beam generating means for generating a beam and means for scanning said photosensitive body with the beam, and wherein said control means controls a beam quantity by using said adjusting means after a beam scan speed of said scanning means is controlled to be constant.

17. An image recording apparatus comprising:
an original scanning main record optical system capable of irradiating a charged are on a photosensitive body with illumination light from an original exposure lamp and erasing an image;
a sub-record optical system capable of selectively irradiating the charged area and erasing an image at a designated area;
light quantity adjusting means for adjusting a light quantity of light output by said sub-record optical system to a predetermined value; and
control means for actuating said light quantity adjusting means during image erasing of said main record optical system,
wherein said main record optical system comprises an original scan system and a white plate disposed at a predetermined position, and said control means causes said original scan system to stop at the predetermined position and causes the illumination light from said original exposure lamp to be emitted onto said white plate so as to erase the image.

* * * * *

UNITED STATES PATENT AND TRADEMARK OFFICE
CERTIFICATE OF CORRECTION

PATENT NO. : 4,931,882

DATED : June 5, 1990

INVENTOR(S) : HIROAKI TAKEDA, ET AL.

It is certified that error appears in the above-identified patent and that said Letters Patent is hereby corrected as shown below:

COLUMN 1

Line 55, "been," should read --been--.

COLUMN 3

Line 42, "patters" should read --patterns--.

COLUMN 6

Line 4, "load 62" should read --load 62,--.
    Line 49, "an" should read --any--.
    Line 64, "ar" should read --are--.

COLUMN 10

Line 4, "to" (second occurrence) should read --to as--.

COLUMN 11

Line 5, "LED 161- 1" should read --LED 161-①--.
    Line 8, "LED 161- 2" should read --LED 161-②--.
    Line 13, "1" should read --①--.
    Line 15, "2" should read --②--.
    Line 17, "3" should read --③--.
    Line 19, "4" should read --④--.
    Line 21, "5" should read --⑤--.
    Line 24, "6" should read --⑥--.
    Line 26, "7" should read --⑦--.
    Line 29, "8" should read --⑧--.
    Line 31, "Modes 5 to 7" should read --Modes ⑤ to ⑦--.
    Line 38, "(Addon" should read --(Add-on--.

UNITED STATES PATENT AND TRADEMARK OFFICE
CERTIFICATE OF CORRECTION

PATENT NO. : 4,931,882

DATED : June 5, 1990

INVENTOR(S) : HIROAKI TAKEDA, ET AL.

It is certified that error appears in the above-identified patent and that said Letters Patent is hereby corrected as shown below:

COLUMN 14

Line 33, "of" should be deleted.
Line 43, "( 3 )" should read --( ③ )--.
Line 49, "( 2 )" should read --( ② )--.
Line 54, "( 4 )" should read --( ④ )--.

COLUMN 16

Line 20, "change" should read --changed--.

COLUMN 18

Line 15, "1 , 2 , 3 , and 1 ." should read
--①, ②, ③, and ①.--.
Line 34, "1 and 2 ," should read --① and ②,--.
Line 38, " 3 ." should read --③. --.
Line 47, "arrows 1" should read --arrows ①--.
Line 48, "2," should read --②,--.
Line 57, "the" (second occurrence) should be deleted.
Line 63, "arrow 1" should read --arrow ①--.

COLUMN 19

Line 58, "multicopy/both side" should read
--multicopy/both-side--.

COLUMN 21

Line 50, "addon" should read --add-on--.

UNITED STATES PATENT AND TRADEMARK OFFICE
CERTIFICATE OF CORRECTION

PATENT NO. : 4,931,882

DATED : June 5, 1990

INVENTOR(S) : HIROAKI TAKEDA, ET AL.

It is certified that error appears in the above-identified patent and that said Letters Patent is hereby corrected as shown below:

COLUMN 22

Line 19, "register 72" should read --register 724--.
    Line 34, "addon" should read --add-on--.

COLUMN 23

Line 66, "read-out" should read --read out--.

COLUMN 24

Line 50, "performs" should be deleted.

COLUMN 25

Line 10, "addon" should read --add-on--.
    Line 38, "addon" should read --add-on--.

COLUMN 26

Line 5, "addon" should read --add-on--.
    Line 44, "and" should be deleted.

COLUMN 27

Line 4, "selects" should read --select--.

COLUMN 30

Line 33, "plane" should read --plate--.

UNITED STATES PATENT AND TRADEMARK OFFICE
CERTIFICATE OF CORRECTION

PATENT NO. : 4,931,882

DATED : June 5, 1990

INVENTOR(S) : HIROAKI TAKEDA, ET AL.

It is certified that error appears in the above-identified patent and that said Letters Patent is hereby corrected as shown below:

COLUMN 31

Line 4, "or" should read --of--.

COLUMN 32

Line 28, "are" should read --area--.

Signed and Sealed this

Fourteenth Day of July, 1992

Attest:

DOUGLAS B. COMER

Attesting Officer

Acting Commissioner of Patents and Trademarks